(12) United States Patent
Park et al.

(10) Patent No.: US 10,575,168 B2
(45) Date of Patent: Feb. 25, 2020

(54) METHOD AND ELECTRONIC DEVICE FOR PROVIDING COMMUNICATION SERVICE

(71) Applicant: Samsung Electronics Co., Ltd., Suwon-si, Gyeonggi-do (KR)

(72) Inventors: Jonghan Park, Suwon-si (KR); Duckey Lee, Suwon-si (KR); Kangjin Yoon, Suwon-si (KR); Sangsoo Lee, Suwon-si (KR); Sanghwi Lee, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/206,517

(22) Filed: Nov. 30, 2018

(65) Prior Publication Data

US 2019/0166488 A1   May 30, 2019

(30) Foreign Application Priority Data

Nov. 30, 2017  (KR) ........................ 10-2017-0163700

(51) Int. Cl.
| | |
|---|---|
| *H04M 1/66* | (2006.01) |
| *H04M 1/68* | (2006.01) |
| *H04M 3/16* | (2006.01) |
| *H04W 12/00* | (2009.01) |
| *H04W 12/04* | (2009.01) |
| *H04W 8/20* | (2009.01) |

(Continued)

(52) U.S. Cl.
CPC ......... *H04W 12/002* (2019.01); *H04W 8/205* (2013.01); *H04W 12/0401* (2019.01);
(Continued)

(58) Field of Classification Search
CPC ........... H04W 12/002; H04W 12/0609; H04W 12/1006; H04W 12/0403; H04W 12/0401; H04W 8/205
(Continued)

(56) References Cited

U.S. PATENT DOCUMENTS 9,722,775 B2 * 8/2017 Hjelm ..................... H04L 9/006
10,075,205 B2   9/2018 Lee et al.
(Continued)

FOREIGN PATENT DOCUMENTS

| KR | 10-2015-0122018 A | 10/2015 |
|---|---|---|
| WO | 2016/178548 A1 | 11/2016 |
| WO | 2017/041306 A1 | 3/2017 |

OTHER PUBLICATIONS

Notification of Transmittal of the International Search Report and the Written Opinion of the International Searching Authority, or the Declaration dated Feb. 15, 2019 in connection with International Patent Application No. PCT/KR2018/014978, 13 pages.

*Primary Examiner* — Marceau Milord

(57) ABSTRACT

Provided is methods and device for providing a communication service. The method according to an embodiment includes generating a logical channel for communication between an electronic component included in a terminal and a local profile assistant (LPA) that is another electronic component in the terminal, generating a secure channel between the electronic component and the LPA when a secure area of the electronic device is selected by the LPA, and receiving profile data for providing the communication service from the LPA through the generated secure channel. An electronic device includes a processor configured to generate a logical channel for communication between one electronic component included in a terminal and a LPA that is another electronic component in the terminal, generate a secure channel between the electronic component and the LPA when a secure area of the electronic device is selected by the LPA, and receive profile data from the LPA.

24 Claims, 19 Drawing Sheets

(51) Int. Cl.
*H04W 12/10* (2009.01)
*H04W 12/06* (2009.01)

(52) U.S. Cl.
CPC ... *H04W 12/0403* (2019.01); *H04W 12/0609* (2019.01); *H04W 12/1006* (2019.01)

(58) Field of Classification Search
USPC ......................................................... 455/411
See application file for complete search history.

(56) References Cited

U.S. PATENT DOCUMENTS

| | | |
|---|---|---|
| 2014/0235210 A1 | 8/2014 | Park et al. |
| 2016/0227409 A1* | 8/2016 | Schell ................. H04L 63/0853 |
| 2016/0254904 A1 | 9/2016 | Hjelm et al. |
| 2017/0048251 A1* | 2/2017 | Guday ................... H04W 12/08 |
| 2017/0155507 A1 | 6/2017 | Park et al. |
| 2018/0084426 A1* | 3/2018 | Yang .................... G06F 21/6218 |
| 2018/0131699 A1 | 5/2018 | Park et al. |
| 2018/0255451 A1* | 9/2018 | Fan ......................... H04W 8/20 |
| 2018/0270363 A1* | 9/2018 | Guday .............. H04M 15/8083 |
| 2018/0302781 A1* | 10/2018 | Lee ......................... H04W 8/20 |
| 2019/0037335 A1* | 1/2019 | Steck .................... H04W 8/245 |
| 2019/0050704 A1* | 2/2019 | Yi .................... G06K 19/07739 |
| 2019/0069171 A1* | 2/2019 | Baldischweiler ... H04L 63/0876 |
| 2019/0074983 A1* | 3/2019 | Yang .................... H04L 9/3066 |
| 2019/0075453 A1* | 3/2019 | Yoon .................... H04W 8/245 |
| 2019/0109948 A1* | 4/2019 | Yu .......................... H04L 12/14 |

\* cited by examiner

METHOD AND ELECTRONIC DEVICE FOR PROVIDING COMMUNICATION SERVICE

CROSS-REFERENCE TO RELATED APPLICATION

This application is based on and claims priority under 35 U.S.C. § 119 to Korean Patent Application No. 10-2017-0163700, filed on Nov. 30, 2017, in the Korean Intellectual Property Office, the disclosure of which is incorporated by reference herein in its entirety.

BACKGROUND

1. Field

The disclosure relates to wireless communication systems, and more particularly, methods and devices for providing communication services.

2. Description of Related Art

Mobile communication terminals may access mobile communication networks and may provide voice communication or data communication services at predetermined positions or while on the move. In this case, appropriate authentication processes are required to provide communication services to mobile communication terminals. In general, a universal integrated circuit card (UICC) is inserted into a mobile communication terminal and authentication between the mobile communication terminal and a server of a mobile carrier is performed by using a universal subscriber identification module (USIM) installed in the UICC. For example, when a customer subscribes to a mobile communication service of a mobile carrier, the mobile carrier may provide a UICC to the customer, the customer may insert the received UICC into his/her mobile communication terminal, and a USIM application installed in the UICC may perform an appropriate authentication process by using a value stored therein with a server of the mobile carrier in which the same value is stored, thereby making it possible for the customer to use the mobile communication service.

A conventional UICC is manufactured as a dedicated card for a specific mobile network operator according to a request of the specific mobile network operator, and is released in a state where the conventional UICC contains, in advance, authentication information for accessing a network of the specific mobile network operator. There is a need to find a method of remotely installing, in a UICC, a USIM application, a subscriber identification ID, an encryption key, etc. for a mobile network operator, and safely and flexibly installing and managing authentication information of various mobile network operators, unlike a conventional UICC manufactured and distributed for a specific mobile network operator.

SUMMARY

Provided are methods and devices for remotely installing, by using a wireless communication method or the like, profile information for providing, through a wireless communication network, a communication service to a terminal in which an electronic device is mounted.

Additional aspects will be set forth in part in the description which follows and, in part, will be apparent from the description, or may be learned by practice of the presented embodiments.

In accordance with an aspect of the disclosure, a method by which an electronic device provides a communication service includes generating a logical channel for communication between one electronic component included in a terminal and a local profile assistant (LPA) that is another electronic component in the terminal, generating a secure channel between the electronic device and the LPA when a secure area of the electronic device is selected by the LPA, and receiving profile data for providing the communication service from the LPA through the generated secure channel.

In one embodiment, receiving the profile data includes receiving the profile data that is protected based on a session key obtained by the LPA.

In another embodiment, receiving the profile data includes receiving, through the LPA, the profile data that is protected based on a session key obtained by a trusted execution environment (TEE) that is an electronic device corresponding to a terminal secure area.

In yet another embodiment, receiving the profile data includes receiving, through the LPA, the profile data that is protected based on the session key obtained by the TEE based on a static shared key and a one-time shared key.

Also, receiving the profile data includes, when a session key obtained by a TEE that is an electronic device corresponding to a terminal secure area, is transmitted to the LPA, receiving the profile data that is protected based on the session key from the LPA.

Further, receiving of the profile data includes, when the session key obtained by the TEE based on a static shared key and a one-time shared key is transmitted to the LPA, receiving the profile data that is protected based on the session key from the LPA.

In addition, receiving the profile data includes receiving, through the LPA and a TEE that is an electronic device corresponding to a terminal secure area, the profile data that is protected based on a session key obtained by an embedded secure element (eSE) that is an electronic device corresponding to a hardware (HW) secure area.

Furthermore, receiving the profile data includes, when a session key obtained by an eSE that is an electronic device corresponding to an HW secure area is transmitted to a TEE that is an electronic device corresponding to a terminal secure area, receiving, through the LPA, the profile data that is protected based on the session key from the TEE.

Additionally, receiving the profile data may include, when a session key obtained by an eSE that is an electronic device corresponding to an HW secure area is transmitted to the LPA through a TEE that is an electronic device corresponding to a terminal secure area, receiving the profile data that is protected based on the session key from the LPA.

Also, the secure channel may be generated based on protection capability information transmitted in a response message from the electronic device to the LPA.

In accordance with another aspect of the disclosure, an electronic device for providing a communication service includes: at least one processor configured to generate a logical channel for communication between the electronic device included in a terminal and a local profile assistant (LPA) that is another electronic device in the terminal, generate a secure channel between the electronic device and the LPA when a secure area of the electronic device is selected by the and receive profile data for providing the communication service from the LPA; and a memory configured to store the profile data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or", is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory compute readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
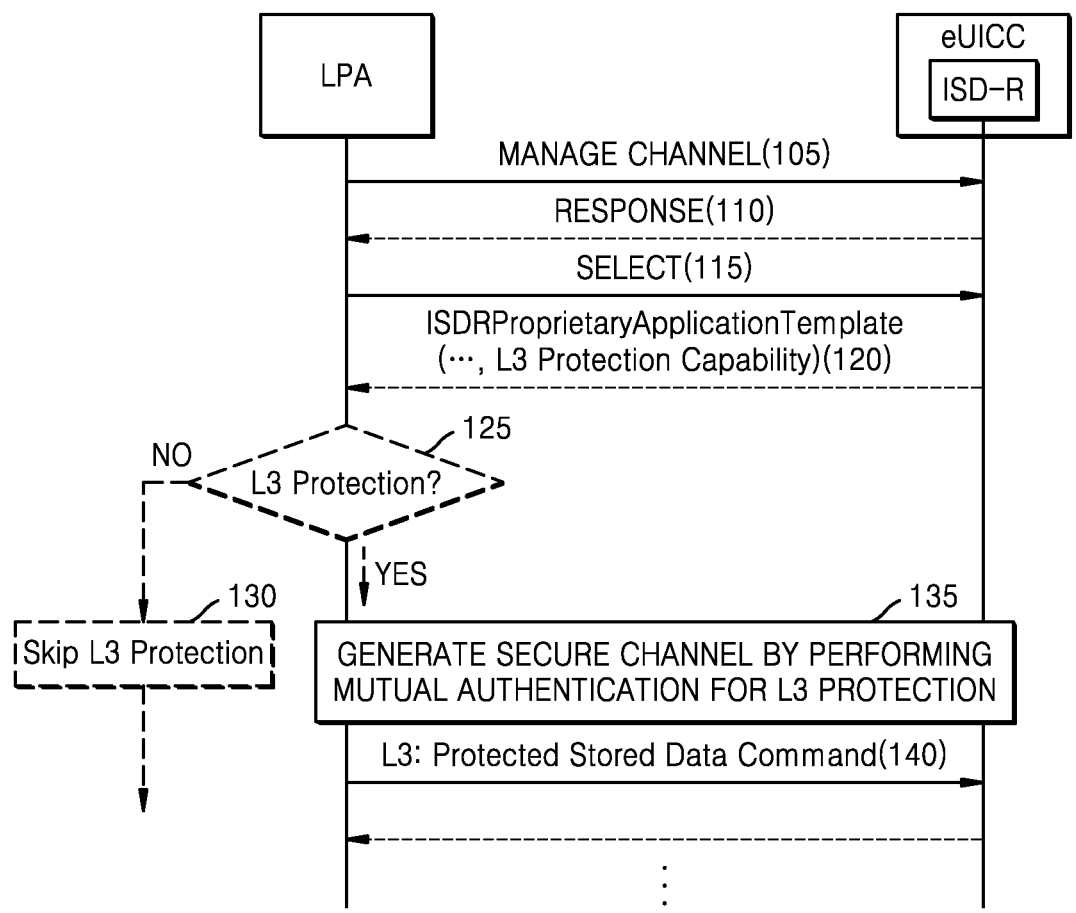
FIG. 1 is an exemplary flowchart of controlling access of a local profile assistant (LPA) in an embedded universal integrated circuit card (eUICC) according to an embodiment.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described with reference to the accompanying drawings. While describing the embodiments, technical content that is well-known in the related fields and not directly related to the present disclosure will not be provided. By omitting redundant descriptions, the essence of the present disclosure will not be obscured and may be clearly explained.

For the same reasons, some components may be exaggerated, omitted, or schematically illustrated in drawings for clarity. Also, the size of each component does not completely reflect the actual size. In the drawings, like reference numerals denote like elements.

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing device, the instructions, which are performed by a processor of a computer or another programmable data processing device, create units for performing functions described in the flowchart block(s). The computer program instructions may be stored in a computer-usable or computer-readable memory capable of directing a computer or another programmable data processing device to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing device, and thus, instructions for operating the computer or the other programmable data processing device by generating a computer-executed process when a series of operations are performed in the computer or the other programmable data processing device may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card.

In the following description of the present disclosure, a detailed description of known functions and configurations incorporated herein will be omitted when it may make the subject matter of the present disclosure rather unclear.

Hereinafter, embodiments of the present disclosure will be described in detail with reference to the accompanying drawings.

First, terms used herein will be described. The terms used in embodiments of this disclosure may be defined as having meanings understood by one of ordinary skill in the art, but, in the case of matters related to embodiments disclosed herein, their operations or properties may be described in accordance with the terms used herein.

In this disclosure, a universal integrated circuit card (UICC) may include any functional equivalent similar to an embedded UICC (eUICC) capable of downloading and installing a profile, and also include any physical equivalent embedded or detachably mounted in a terminal.

For example, a UICC is a smart card inserted into a mobile communication terminal and may refer to a chip that stores personal information of a mobile communication subscriber such as network access authentication information, a phone number list and a short message service (SMS), and performs subscriber authentication and traffic security key generation when a connection is made to a mobile communication network such as global system for mobile communications (GSM), wideband code division multiple access (WCDMA), or long-term evolution (LTE), thereby making it possible to stably use mobile communication. The UICC is embedded with a communication application such as a subscriber identification module (SIM), a universal SIM (USIM), or an Internet Protocol (IP) multimedia SIM (ISIM), according to a type of the mobile communication network to which a subscriber connects. In addition, the UICC may provide a high-level security function for loading various applications such as an electronic wallet, ticketing, and an electronic passport.

For example, although an eUICC that is an example of a UICC is assumed as a chip-type security module that is embedded in a terminal and may not be detachable, embodiments of this disclosure may be applied equally to any UICC that is manufactured in the form of a typical detachable UICC and has the same function and electrical and software characteristics as the eUICC.

Also, in this disclosure, a UICC or an eUICC may be referred to as an electronic device or a small electronic device. An electronic device including a UICC or an eUICC may include a processor for processing a signal and a memory for storing a profile as described below with reference to the drawings. Also, when the electronic device including the UICC or the eUICC is manufactured to be attachable to/detachable from a terminal, the electronic device may further include an interface for accessing the terminal.

A UICC according to embodiments of the present disclosure may download and install a profile by using a general IP network such as a wireless communication network or WiFi. Various embodiments of this present disclosure may be applied regardless of a type of a network through which the profile is downloaded.

In this disclosure, a profile may refer to a software package including at least one of an application, a file system, and an authentication key stored in a UICC.

In this disclosure, a USIM profile may have the same meaning as the profile or may refer to a software package containing information included in a USIM application within the profile.

In this disclosure, a profile provider may be referred to as a subscription manager (SM), a subscription manager plus (SM+), a subscription manager data preparation plus (SM-DP+), a profile delivery platform, or a profile delivery server. The profile server may be implemented as a plurality of physical servers. The profile server may transmit, to a terminal, an encrypted profile that may be decrypted with an encryption key generated through mutual authentication with an eUICC.

According to an embodiment, a profile encrypted by an SM-DP+ may be transmitted through a secure channel between a local profile assistant (LPA) and an eUICC. For convenience of explanation, when the profile encrypted by the SM-DP+ is transmitted through the secure channel between the LPA and the eUICC, it may be assumed that profile data is transmitted through the secure channel between the LPA and the eUICC.

In this disclosure, a mobile communication network may include a home location register (HLR) and an authentication center (AuC) server to which a terminal connects to perform a subscriber authentication function, and includes a network and a server that may provide voice communication or data communication through access after authentication.

The term 'terminal' used herein may be referred to as a mobile station (MS), a user equipment (UE), a user terminal (UT), a wireless terminal, an access terminal (AT), a user device, a subscriber unit, a subscriber station (SS), a wireless device, a wireless communication device, a wireless transmit/receive unit (WTRU), a mobile node, a mobile, or the like. When referring to a terminal without distinction, the terminal may include a UICC when the UICC is inserted as a socket into a terminal and an eUICC embedded in a terminal. When connected with the help of an additional communication device by using technology such as a Bluetooth SIM access profile between a terminal and a UICC, the terminal may refer to a terminal including the UICC.

Various examples of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and reproducing appliance having a wireless communication function, a home appliance capable of wireless Internet access and browsing, and any portable unit or terminal that incorporates a combination of the above functions. Also, the examples of the terminal may include a measuring instrument having a communication function.

In this disclosure, a terminal may include, but is not limited to, a machine-to-machine (M2M) terminal or a machine-type communication (MTC) terminal/device.

In this disclosure, a profile identifier may be referred to as profile identification information, a profile ID, an integrated circuit card ID (ICCID), or a factor matched to the ICCID and an issuer security domain-profile (ISD-P). For example, the profile ID may indicate a unique ID of each profile. The profile identifier may be used to identify a profile on a network.

In this disclosure, a UICC identifier may be a unique identifier of a UICC for a terminal, and may be referred to as a UICC identifier or an eUICC ID (EID).

Hereinafter, for convenience of explanation, a UICC that downloads and installs a profile will be referred to as an eUICC. Also, in the description of the following embodiments, an LPA may refer to some or all modules other than the eUICC in a terminal or a combination of the modules.

For example, when an LPA transmits a "MANAGE CHANNEL" application protocol data unit (APDU) command to an eUICC, it may mean at least one of 1) an operation by which the LPA directly transmits the "MANAGE CHANNEL" APDU command to the eUICC, 2) an operation by which the LPA transmits information corresponding to the "MANAGE CHANNEL" APDU command to a module other than the eUICC in a terminal and then the module transmits the information corresponding to the "MANAGE CHANNEL" APDU command to the eUICC, and 3) an operation by which a module other than the eUICC in the terminal recognizes a trigger operation causing the LPA to transmit the "MANAGE CHANNEL" APDU command and the module transmits the "MANAGE CHANNEL" APDU command to the eUICC based on a recognition result.

Also, a storage area of secret key information used to form a secure channel between the LPA and the eUICC does not necessarily have to be in the LPA. For example, when the LPA generates a mutual secure channel with the eUICC by using a secret key, a storage area of the secret key may be as follows.

1) LPA.
2) A terminal secure area such as a trusted execution environment (TEE).
3) An additional hardware (HW) secure area in the terminal such as an embedded secure element (eSE) or a smart secure platform (SSP).

Also, according to another embodiment, the LPA itself may operate in the terminal secure area or the HW secure area. In this disclosure, a secret key refers to a key that has to be used to control the eUICC as follows. Specifically, the secret key may be one of the following information or a combination thereof.

1) A symmetric key
2) A Secure Channel Protocol SCP03 symmetric key
3) An asymmetric key
4) A public key of the asymmetric key
5) A private key of the asymmetric key
6) An authentication certificate
7) A private key of the authentication certificate
8) An authentication certificate for SCP11a
9) A private key of the authentication certificate for SCP11a
10) An authentication certificate for SCP11b
11) A private key of the authentication certificate for SCP11b
12) One or more root authentication certificates
13) An authentication certificate chain including the one or more root authentication certificates.

Also, in addition, another type of secret key that may be used when the eUICC decrypts or verifies a command controlled by a module other than the eUICC in the terminal while communicating with the module may be used.

The description of embodiments in addition to the above principles is intended to assist in understanding the spirit of the present disclosure and is not intended to limit the scope of the present disclosure to the embodiments.

FIG. 1 is a flowchart of a method of controlling access of an LPA in an eUICC according to an embodiment.

In operation 105, the LPA may transmit a "MANAGE CHANNEL" APDU command to the eUICC.

In operation 110, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 115, the LPA may select an issuer security domain-root (ISD-R) corresponding to a secure area of the eUICC by using a "SELECT" command.

In operation 120, the eUICC may transmit an ISDR Proprietary Application Template including information about a layer 3 (L3) protection capability to the LPA as a reply. The L3 protection capability may include information indicating whether to support a secure channel forming function of the eUICC or specifying a supported secure channel. Even when the L3 protection capability is not included in the ISDRProprietaryApplicationTemplate, the LPA may use a pre-determined secure channel forming method and a secret key suitable for the pre-determined secure channel forming method.

In operation 125, the LPA may determine whether the eUICC supports a security panel according to L3 protection.

In operation 130, when the eUICC does not support the secure channel, the LPA may skip an additional secure channel function and then may communicate with the eUICC by using a "Store Data" command.

In operation 135, when the eUICC supports the secure channel function, the LPA may generate a secure channel by performing mutual authentication for L3 protection with the eUICC.

Figure 2:
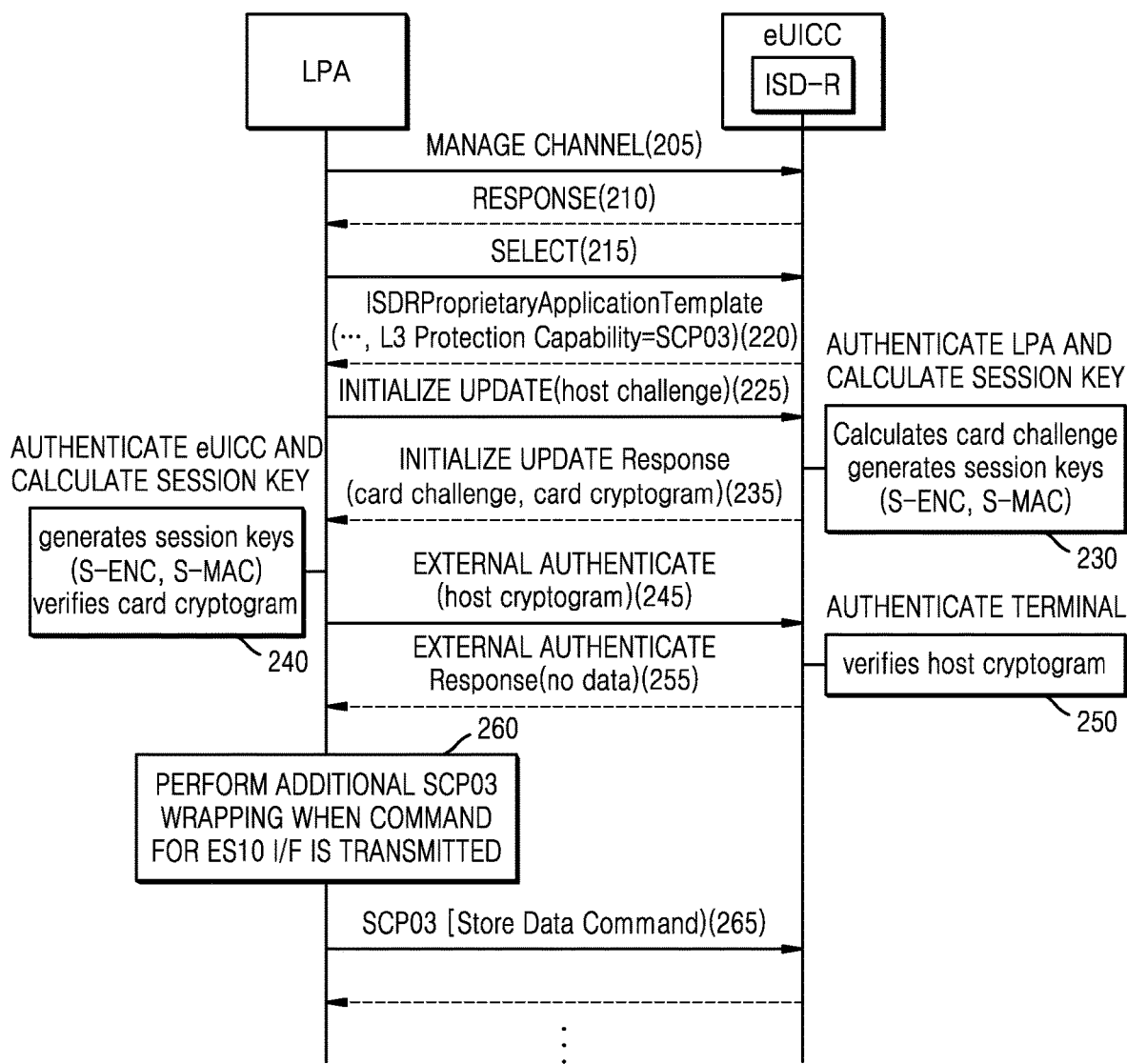
FIG. 2 is an exemplary flowchart of controlling access of the LPA in the eUICC according to another embodiment.

In operation 140, the LPA may control the eUICC by allowing the following messages to be included in the "Store Data" command and transmitting the same through the generated secure channel.
  GetEuicc Configured Addresses
  Set Default Dp Address
  Prepare Download
  Load Bound Profile Package
  Get EUICC Challenge
  Get EUICC Info
  List Notification
  Retrieved Notification List
  Remove Notification From List
  Load CRL
  Authenticate Server
  Cancel Session
  Get Profiles Info
  Enable Profile
  Disable Profile
  Delete Profile
  eUICC Memory Reset
  Get EID
  Set Nickname
  Get RAT FIG. 2 is a flowchart of a method of controlling access of the LPA in the eUICC according to another embodiment.

In operation 205, the LPA may transmit a "MANAGE CHANNEL" APDU command to the eUICC.

In operation 210, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 215, the LPA may select an ISD-R corresponding to a secure area of the eUICC by using a "SELECT" command.

In operation 220, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. In the present embodiment, it is assumed that the L3 protection capability supports SCP03.

In operation 225, the LPA may generate a host challenge to generate an SCP03 secure channel and may transmit an INITIALIZE UPDATE APDU including the host challenge to the eUICC.

In operation 230, the eUICC may generate a session key or a session key set of an SCP03 session by using at least one of a card challenge value that is internally generated, the received host challenge, a sequence counter value, and an SCP03 symmetric key that is stored in the eUICC. The session key or the session key set may include at least one of the following.
  An S-ENC key for encryption/decryption
  An S-MAC key for integrity protection of a message sent by the LPA
  An R-MAC key for integrity protection of a response message sent by the eUICC Also, the eUICC may generate a card cryptogram used for verification of mutual authentication between the eUICC and the LPA.

In operation 235, the eUICC may allow the generated card cryptogram and a card challenge to be included in an INITIALIZE UPDATE Response and may transmit the INITIALIZE UPDATE Response to the LPA. However, this is an example, and according to another embodiment, a sequence counter may be further included in the INITIALIZE UPDATE Response.

In operation 240, the LPA may verify the received card cryptogram by using an SCP03 symmetric key. Also, the LPA may generate a session key or a session key set of the SCP03 session that is the same as that generated by the eUICC by using at least one of the SCP03 symmetric key, the card challenge, the host challenge, and the sequence counter.

In operation 245, after the cryptogram passes the verification and the session key is generated, the LPA may allow a host cryptogram generated by using the SCP03 symmetric key to be included in an EXTERNAL AUTHENTICATE APDU message and may transmit the EXTERNAL AUTHENTICATE APDU message so that the eUICC authenticates the LPA.

In operation 250, the eUICC may verify the host cryptogram received from the LPA and may confirm that the LPA has a valid SCP03 symmetric key.

In operation 255, the eUICC may transmit an EXTERNAL AUTHENTICATE Response to the LPA to generate an SCP03 secure channel and may notify the LPA that preparation has been made.

In operation 260, the LPA may perform additional SCP03 wrapping when a command for an ES10 interface (I/F) is transmitted.

Figure 3:
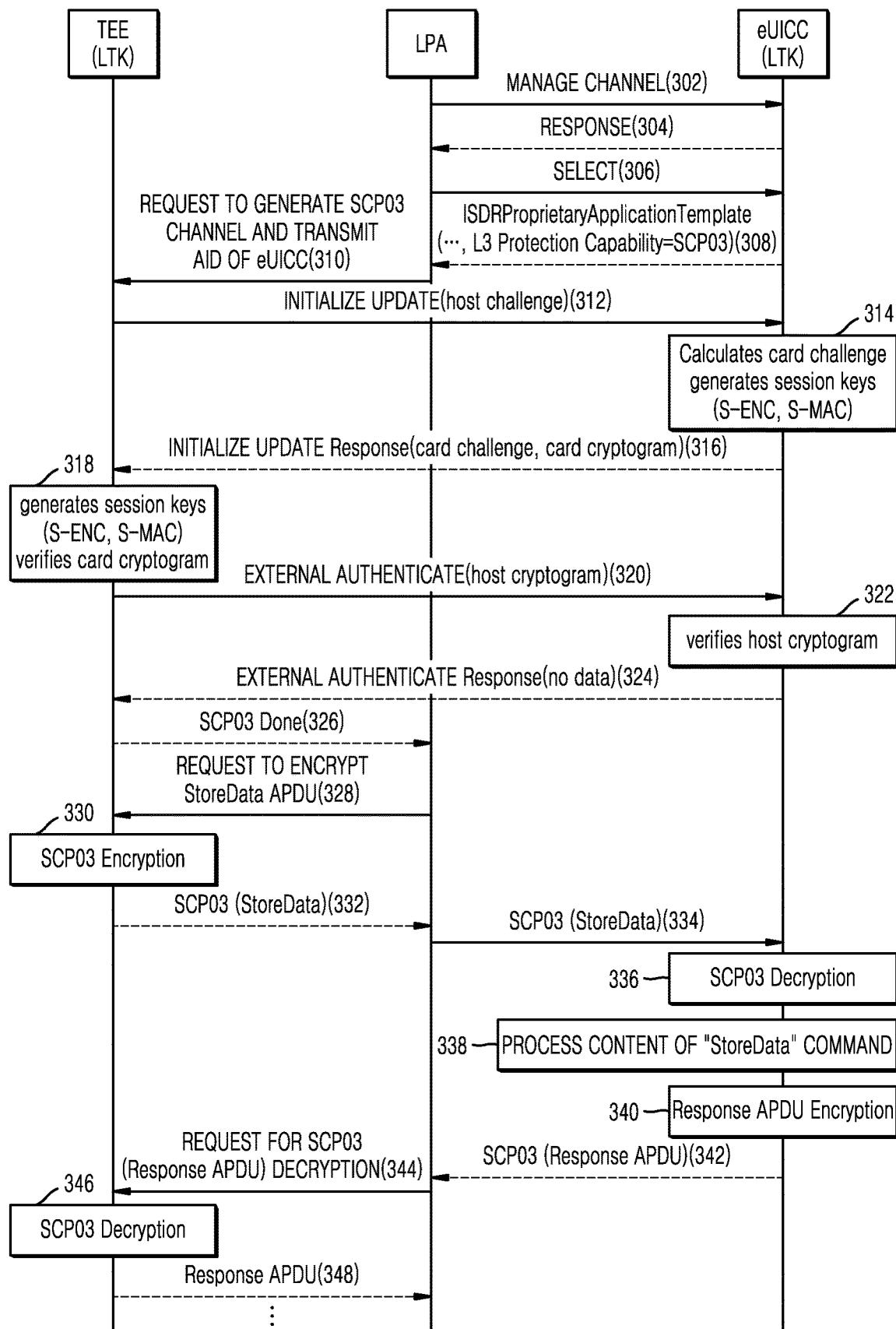
FIG. 3 is an exemplary flowchart of controlling access of the LPA in the eUICC according to another embodiment.

In operation 265, the LPA may allow the following ES10 commands to be included in a Store Data APDU, and then may transmit the Store Data APDU to the eUICC by using the generated secure channel.
  Get Euicc Configured Addresses
  Set Default Dp Address
  Prepare Download
  Load Bound Profile Package
  Get EUICC Challenge
  Get EUICC Info
  List Notification Retrieved Notification List
Remove Notification From List
Load CRL
Authenticate Server
Cancel Session
Get Profiles Info
Enable Profile
Disable Profile
Delete Profile
eUICC Memory Reset
Get EID
Set Nick name
Get RAT FIG. 3 is a flowchart of a method of controlling access of the LPA in the eUICC according to another embodiment.

In operation 302, the LPA may transmit a "MANAGE CHANNEL" APDU command to the eUICC.

In operation 304, as the eUICC receives the "MANAGE CHANNEL" APDU command, the eUICC may transmit a response APDU to the LPA. The response APDU may include a logical channel value. Accordingly, a logical channel for communication between the LPA and the eUICC may be generated.

In operation 306, the LPA may select an ISD-R corresponding to a secure area of the eUICC by using a "SELECT" command.

In operation 308, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. In the present embodiment, it is assumed that the L3 protection capability supports SCP03.

In operation 310, the LPA may request a TEE that is a terminal secure area to generate an SCP03 secure channel. In this case, the LPA may transmit an application identifier (AID) of the eUICC ISD-R.

In operation 312, the TEE that is the terminal secure area may generate a host challenge and may transmit an INITIALIZE UPDATE APDU including the host challenge to the eUICC. The INITIALIZE UPDATE APDU may be transmitted through the LPA to the eUICC. In this case, the LPA may transmit the INITIALIZE UPDATE APDU to the selected ISD-R and the pre-generated logical channel. However, this is an example, and according to another embodiment, the TEE may transmit the INITIALIZE UPDATE APDU to the eUICC without passing through the LPA. In this case, the TEE may make preparation for transmitting the INITIALIZE UPDATE APDU to the eUICC by using a "MANAGE CHANNEL" command and a "SELECT" command.

In operation 314, the eUICC may generate a session key or a session key set of an SCP03 session by using a card challenge value that is internally generated, the received host challenge, a sequence counter value, and an SCP03 symmetric key that is stored in the eUICC. The session key or the session key set may include at least one of the following.

An S-ENC key for encryption/decryption
An S-MAC key for integrity protection of a message sent by the LPA
An R-MAC key for integrity protection of a response message sent by the eUICC Also, the eUICC may generate a card cryptogram used for verification of mutual authentication between the eUICC and the LPA or the terminal secure area.

In operation 316, the eUICC may allow the generated card cryptogram and a card challenge to be included in an INITIALIZE UPDATE Response and may transmit the INITIALIZE UPDATE Response to the LPA. However, this is an example, and according to another embodiment, a sequence counter may be further included in the INITIALIZE UPDATE Response.

In operation 318, the TEE that is the terminal secure area may verify the received card cryptogram by using an SCP03 symmetric key that is stored in the TEE. Also, the TEE may generate a session key or a session key set of the SCP03 session that is the same as that generated by the eUICC by using at least one of the SCP03 symmetric key, the card challenge, the host challenge, and the sequence counter.

In operation 320, after the card cryptogram passes the verification and the session key is generated, the TEE that is the terminal secure area may allow a host cryptogram generated by using the SCP03 symmetric key to be included in an EXTERNAL AUTHENTICATE APDU message and may transmit the EXTERNAL AUTHENTICATE APDU message through the LPA to the eUICC so that the eUICC authenticates the terminal secure area.

In operation 322, the eUICC may verify the host cryptogram received from the LPA and may confirm that the LPA has a valid SCP03 symmetric key.

In operation 324, the eUICC may transmit an EXTERNAL AUTHENTICATE Response to the LPA to generate an SCP03 secure channel and may notify the LPA that preparation has been made. The LPA may transmit the EXTERNAL AUTHENTICATE Response to the terminal secure area.

In operation 326, the terminal secure area may transmit, to the LPA, a message indicating that generation is completed as a response to an SCP03 secure channel generating request.

In operation 328, the LPA may allow the following ES10 commands to be included in a Store Data APDU, and then may transmit the Store Data APDU to the TEE.

Get Euicc Configured Addresses
Set Default Dp Address
Prepare Download
Load Bound Profile Package
Get EUICC Challenge
Get EUICC Info
List Notification
Retrieved Notification List
Remove Notification From List
Load CRL
Authenticate Server
Cancel Session
Get Profiles Info
Enable Profile
Disable Profile
Delete Profile
eUICC Memory Reset
Get EID
Set Nick name
Get RAT In operation 330, the TEE that is the terminal secure area may perform SCP03 protection on the received Store Data APDU.

In operation 332, the TEE that is the terminal secure area may transmit a "Store Data" command that is SCP03 protected to the LPA.

In operation 334, the LPA may transmit the "Store Data" command to the eUICC.

In operation 336, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 338, when no failure occurs in the verification or the decryption, the eUICC may process content of the "Store Data" command.

In operation 340, the eUICC may perform SCP03 protection on an APDU response message.

In operation 342, the eUICC may transmit a response APDU that is SCP03 protected to the LPA.

In operation 344, the LPA may transmit the response APDU that is SCP03 protected to the terminal secure area and may request the terminal secure area for SCP03 decryption.

In operation 346, the TEE that is the terminal secure area may decrypt the response APDU that is SCP03 protected by using at least one of the generated S-ENC and R-MAC keys.

In operation 348, the TEE that is the terminal secure area may transmit the response APDU to the LPA.

The LPA may use a security function provided by the terminal secure area when transmitting an ES10 message used to download a profile or read information of the eUICC to the eUICC, by repeating the above process of FIG. 3.

Figure 4:
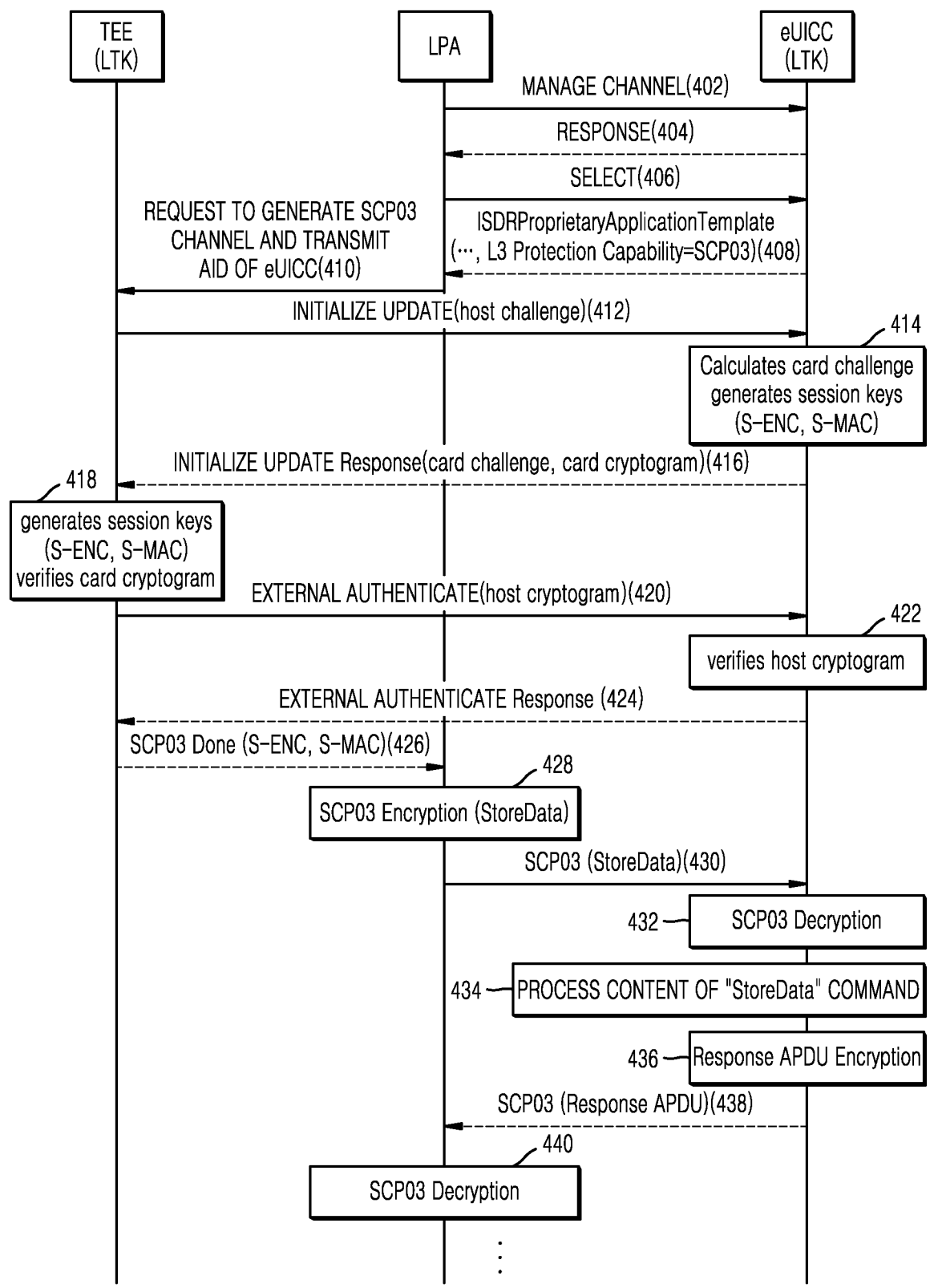
FIG. 4 is an exemplary flowchart of controlling access of the LPA in the eUICC according to another embodiment.

FIG. 4 is a flowchart of a method of controlling access of the LPA in the eUICC according to another embodiment.

In operation 402, the LPA may transmit a "MANAGE CHANNEL" APDU command to the eUICC.

In operation 404, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 406, the LPA may select an ISD-R corresponding to a secure area of the eUICC by using a "SELECT" command.

In operation 408, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. In the present embodiment, it is assumed that the L3 protection capability supports SCP03.

In operation 410, the LPA requests the TEE that is the terminal secure area to generate an SCP03 secure channel. In this case, the LPA may transmit an AID of the eUICC ISD-R to the TEE.

In operation 412, the TEE that is the terminal secure area may generate a host challenge and may transmit an INITIALIZE UPDATE APDU including the host challenge to the eUICC. The INITIALIZE UPDATE APDU may be transmitted through the LPA. In this case, the LPA may transmit the INITIALIZE UPDATE APDU to the selected ISD-R and the pre-generated logical channel. Also, according to another embodiment, the TEE may transmit the INITIALIZE UPDATE APDU to the eUICC without passing through the LPA. In this case, the TEE may make preparation for transmitting the INITIALIZE UPDATE APDU to the eUICC by using a "MANAGE CHANNEL" command and a "SELECT" command.

In operation 414, the eUICC may generate a session key or a session key set of an SCP03 session by using a card challenge value that is internally generated, the received host challenge, a sequence counter value, and an SCP03 symmetric key that is stored in the eUICC. The session key or the session key set may include at least one of the following.

An S-ENC key for encryption/decryption

An S-MAC key for integrity protection of a message sent by the LPA

An R-MAC key for integrity protection of a response message sent by the eUICC

Also, the eUICC may generate a card cryptogram used for verification of mutual authentication between the eUICC and the LPA or the terminal secure area.

In operation 416, the eUICC may allow the generated card cryptogram and a card challenge to be included in an INITIALIZE UPDATE Response and may transmit the INITIALIZE UPDATE Response to the LPA. However, this is an example, and according to another embodiment, a sequence counter may be further included in the INITIALIZE UPDATE Response.

In operation 418, the TEE that is the terminal secure area may verify the received card cryptogram by using an SCP03 symmetric key that is stored in the TEE. Also, the TEE may generate a session key or a session key set of the SCP03 session that is the same as that generated by the eUICC by using at least one of the SCP03 symmetric key, the card challenge, the host challenge, and the sequence counter.

In operation 420, after the card cryptogram passes the verification and the session key is generated, the TEE that is the terminal secure area may allow a host cryptogram generated by using the SCP03 symmetric key to be included in an EXTERNAL AUTHENTICATE APDU message and may transmit the EXTERNAL AUTHENTICATE APDU message through the LPA to the eUICC so that the eUICC authenticates the terminal secure area.

In operation 422, the eUICC may verify the host cryptogram received from the LPA and may confirm that the LPA has a valid SCP03 symmetric key.

In operation 424, the eUICC may transmit the EXTERNAL AUTHENTICATE Response to the LPA to generate an SCP03 secure channel and may notify the LPA that preparation has been made. The LPA may transmit the EXTERNAL AUTHENTICATE Response to the terminal secure area.

In operation 426, the TEE that is the terminal secure area may transmit, to the LPA, a message indicating that generation is completed as a response to an SCP03 secure channel generating request and at least one of the additionally generated S-ENC, S-MAC, and R-MAC keys.

In operation 428, the LPA may allow the following ES10 commands to be included in a Store Data APDU, and then may perform SCP03 protection stead of transmitting the ES10 command to the terminal secure area.

Get Euicc Configured Addresses
Set Default Dp Address
Prepare Download
Load Bound Profile Package
Get EUICC Challenge
Get EUICC Info
List Notification
Retrieved Notification List
Remove Notification From List Load CRL
Authenticate Server
Cancel Session
Get Profiles Info
Enable Profile
Disable Profile
Delete Profile
eUICC Memory Reset
Get EID
Set Nickname
Get RAT In operation 430, the LPA may transmit a "Store Data" command that is SCP03 protected to the eUICC.

In operation 432, the eUICC may verify or decrypt the "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 434, when no failure occurs in the verification or the decryption, the eUICC may process content of the "Store Data" command.

In operation 436, the eUICC may perform SCP03 protection on an APDU response message.

In operation 438, the eUICC may transmit the APDU response message that is SCP03 protected to the LPA.

In operation 440, the LPA may decrypt the APDU response message that is SCP03 protected by using at least one of the S-ENC and R-MAC keys and then may extract and process the APDU response message.

The LPA may use a security function provided by the terminal secure area when transmitting an ES10 message used to download a profile or read information of the eUICC, by repeating the above process of FIG. 4.

Figure 5:
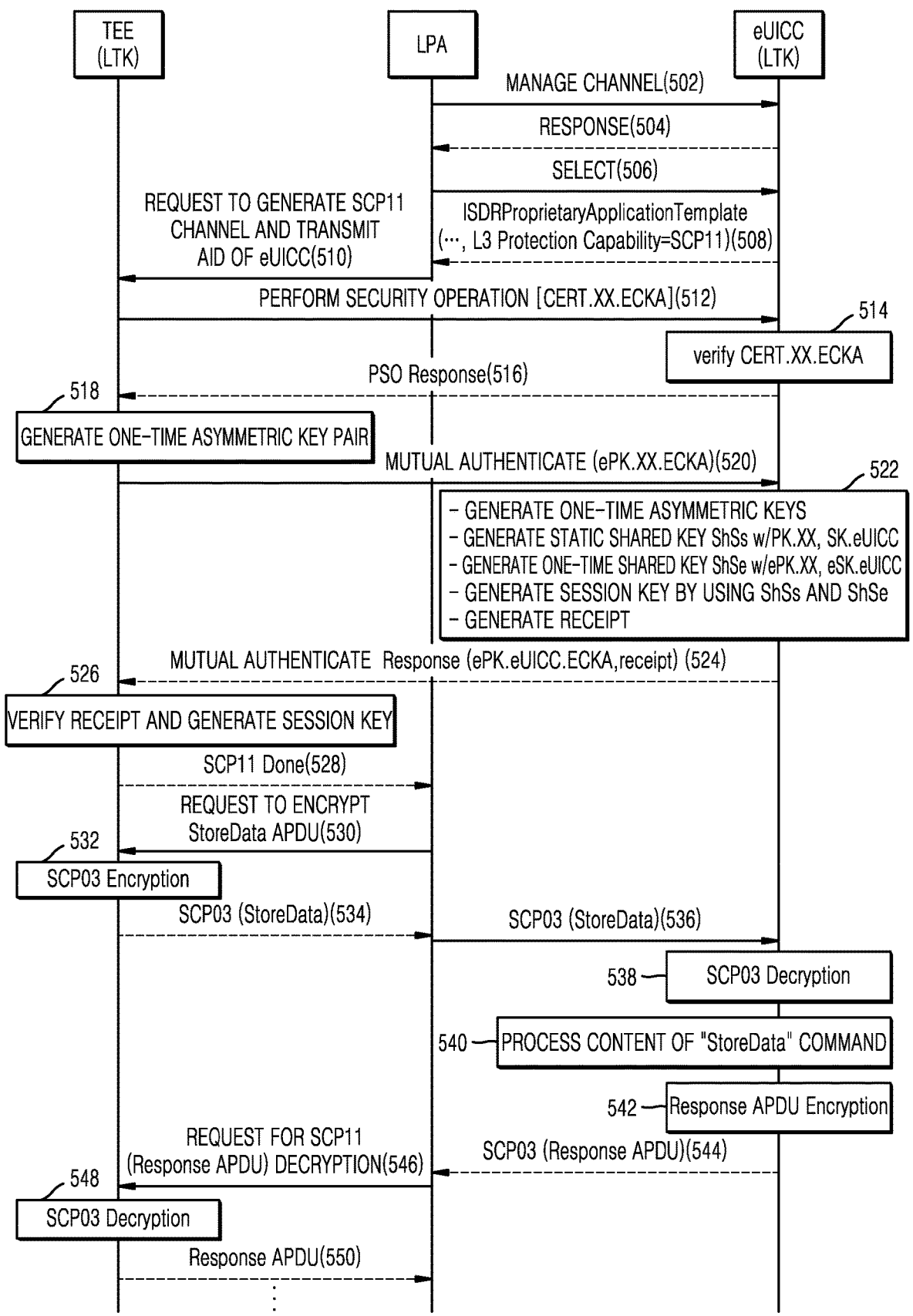
FIG. 5 is an exemplary flowchart of controlling access of the LPA in the eUICC according to another embodiment.

FIG. 5 is a flowchart of a method of controlling access of the LPA in the eUICC according to an embodiment.

In operation 502, the LPA may transmit a "MANAGE CHANNEL" APDU command to the eUICC.

Accordingly, a logical channel for communication between the LPA and the eUICC may be generated.

In operation 504, as the eUICC receives the "MANAGE CHANNEL" APDU command, the eUICC may transmit a response APDU to the LPA. The response APDU may include a logical channel value.

In operation 506, the LPA may select an ISD-R corresponding to a secure area of the eUICC by using a "SELECT" command.

In operation 508, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. Although the L3 protection capability may support SCP11a or SCP11b, it is assumed that the L3 protection capability supports SCP11a in the present embodiment.

In operation 510, the LPA may request the TEE that is the terminal secure area to generate an SCP11a secure channel. In this case, the eUICC may transmit an AID of an ISD-R to the TEE.

In operation 512, the TEE that is the terminal secure area may transmit, to the eUICC, a PERFORM SECURITY OPERATION APDU including an authentication certificate CERT.XX.ECKA that is stored in the TEE. In this case, the LPA may transmit the PERFORM SECURITY OPERATION APDU to the selected ISD-R and the pre-generated logical channel. However, this is an example, and according to another embodiment, the TEE may transmit the PERFORM SECURITY OPERATION APDU to the eUICC without passing through the LPA. In this case, the TEE may make preparation for transmitting the PERFORM SECURITY OPERATION APDU to the eUICC by using a "MANAGE CHANNEL" command and a "SELECT" command.

In operation 514, when receiving the PERFORM SECURITY OPERATION APDU, the eUICC may verify the authentication certificate CERT.XX.ECKA included in the PERFORM SECURITY OPERATION APDU. In this case, a CA certificate used to verify the authentication certificate CERT.XX.ECKA, a public key, or information calculated with the public key may be stored in the Euicc In operation 516, when the authentication certificate CERT.XX.ECKA passes the verification, the eUICC may transmit a PERFORM SECURITY OPERATION (PSO) Response to the LPA, and the LPA may transmit the PSO Response to the TEE that is the terminal secure area.

In operation 518, the TEE that is the terminal secure area may generate a one-time asymmetric key pair. The one-time asymmetric key pair may be ePK.XX.ECKA and eSK.XX.ECKA. Also, XX may be a symbol for distinguishing an entity indicating an asymmetric key.

In operation 520, the TEE that is the terminal secure area may allow the generated asymmetric key ePK.XX.ECKA to be included in a MUTUAL AUTHENTICATE APDU and may transmit the MUTUAL AUTHENTICATE APDU through the LPA to the eUICC.

In operation 522, the eUICC may receive the MUTUAL AUTHENTICATE APDU and may perform the following.
  Generate one-time asymmetric keys (ePK.eUICC.ECKA and eSK.eUICC.ECKA)
  Generate a static shared key ShSs by using an eUICC private key (SK.EUICC.ECKA) stored in the eUICC and a public key (PK.XX.ECKA) included in the authentication certificate CERT.XX.ECKA
  Generate a one-time shared key ShSe by using the asymmetric keys ePK.XX.ECKA and eSK.eUICC.ECKA
  Generate a session key or a session key set of an SCP03 session by using the static shared key ShSs and the one-time shared key ShSe
  Generate a receipt In operation 524, the eUICC may allow the asymmetric key ePK.eUICC.ECKA and the receipt to be included in a MUTUAL AUTHENTICATE Response and may transmit the MUTUAL AUTHENTICATE Response to the LPA. The LPA may transmit the MUTUAL AUTHENTICATE Response to the TEE that is the terminal secure area.

In operation 526, when receiving the MUTUAL AUTHENTICATE Response, the TEE that is the terminal secure area may verify the receipt and may generate an SCP03 session key or an SCP03 session key set.

In operation 528, the TEE that is the terminal secure area may transmit, to the LPA, a message indicating that generation is completed as a response to an SCP11a secure channel generating request.

In operation 530, the LPA may allow the following ES10 commands to be included in a Store Data APDU, and then may transmit the Store Data APDU to the TEE that is the terminal secure area.

Get Euicc Configured Addresses—Set Default Dp Address
  Prepare Download
  Load Bound Profile Package
  Get EUICC Challenge
  Get EUICC Info
  List Notification
  Retrieved Notification List
  Remove Notification From List
  Load CRL
  Authenticate Server
  Cancel Session
  Get Profiles Info
  Enable Profile
  Disable Profile
  Delete Profile
  eUICC Memory Reset
  Get EID
  Set Nickname
  Get RAT In operation 532, the TEE that is the terminal secure area may perform SCP03 protection on the received Store Data APDU.

In operation 534, the TEE that is the terminal secure area may transmit a "Store Data" command that is SCP03 protected to the LPA.

In operation 536, the LPA may transmit the "Store Data" command to the eUICC.

In operation 538, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 540, when no failure occurs in the verification or the decryption, the eUICC may process content of the "Store Data" command.

In operation 542, the eUICC may perform SCP03 protection on an APDU response message.

In operation 544, the eUICC may transmit the APDU response message that is SCP03 protected to the LPA.

In operation 546, the LPA may transmit the APDU response message that is SCP03 protected to the terminal secure area and may request the terminal secure area for SCP03 decryption.

In operation 548, the terminal secure area may perform decryption by using at least one of the generated S-ENC and R-MAC keys and then may transmit a response APDU to the LPA.

The LPA may use a security function provided by the terminal secure area when transmitting an ES10 message used to download a profile or read information of the eUICC to the eUICC, by repeating the above process of FIG. 5.

Figure 6:
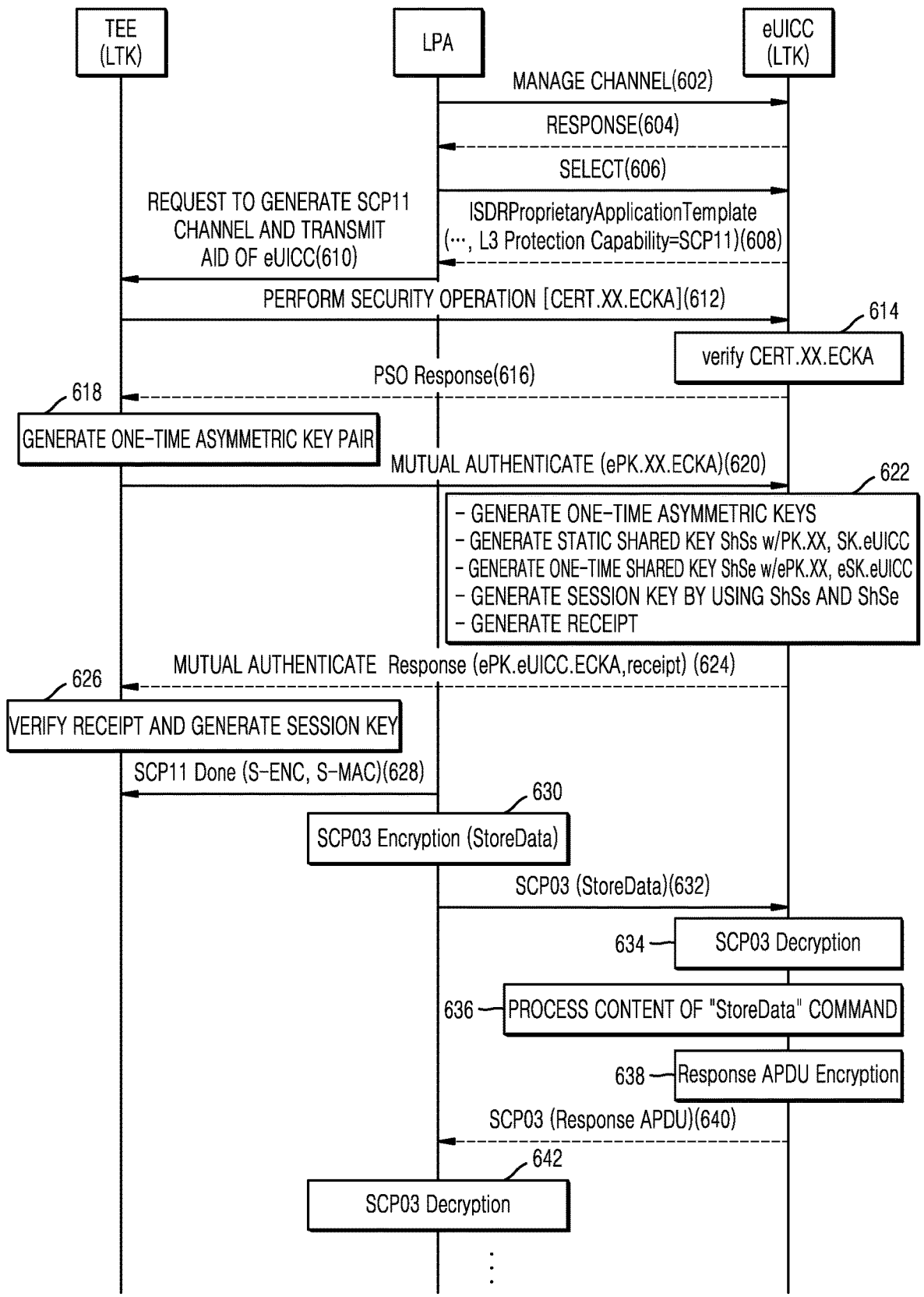
FIG. 6 is an exemplary flowchart of controlling access of the LPA in the eUICC according to another embodiment.

FIG. 6 is a flowchart of a method of controlling access of the LPA in the eUICC according to another embodiment.

In operation 602, the LPA may transmit a "MANAGE CHANNEL" APDU command to the eUICC.

In operation 604, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 606, the LPA may select an ISD-R corresponding to a secure area of the eUICC by using a "SELECT" command.

In operation 608, the eUICC may transmit an ISDR. Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. Although the L3 protection capability may support SCP11a or SCP11b, it is assumed that the L3 protection capability supports SCP11a in the present embodiment.

In operation 610, the LPA may request the terminal secure area to generate an SCP11a secure channel. In this case, an AID of the eUICC ISD-R may be transmitted.

In operation 612, the TEE that is the terminal secure area may transmit, to the eUICC, a PERFORM SECURITY OPERATION APDU including an authentication certificate CERT.XX.ECKA that is stored in the TEE. The PERFORM SECURITY OPERATION APDU may be transmitted through the LPA. In this case, the LPA may transmit the PERFORM SECURITY OPERATION APDU to the selected ISD-R and the pre-generated logical channel. According to another embodiment, the TEE may transmit the PERFORM SECURITY OPERATION APDU without passing through the LPA. In this case, the TEE may make preparation for transmitting the PERFORM SECURITY OPERATION APDU to the eUICC by using a "MANAGE CHANNEL" command and a "SELECT" command.

In operation 614, the eUICC may verify the authentication certificate CERT.XX.ECKA included in the PERFORM SECURITY OPERATION APDU. In this case, a CA certificate used to verify the authentication certificate CERT.XX.ECKA, a public key, or information calculated with the public key may be stored in the eUICC.

In operation 616, when the authentication certificate CERT.XX.ECKA passes the verification, the eUICC may transmit a PSO Response to the LPA, and the LPA may transmit the PSO Response to the TEE that is the terminal secure area.

In operation 618, the TEE that is the terminal secure area may generate a one-time asymmetric key pair.

The one-time asymmetric key pair may be ePK.XX.ECKA and eSK.XX.ECKA. XX may be a symbol for distinguishing an entity indicating an asymmetric key.

In operation 620, the TEE that is the terminal secure area may transmit a MUTUAL AUTHENTICATE APDU including the asymmetric key ePK.XX.ECKA through the LPA to the eUICC.

In operation 622, when receiving the MUTUAL AUTHENTICATE APDU, the eUICC may perform the following.

Generate one-time asymmetric keys (ePK.eUICC.ECKA and eSK.eUICC.ECKA)
  Generate a static shared key ShSs by using an eUICC private key (SK.EUICC.ECKA) stored in the eUICC and a public key (PK.XX.ECKA) included in the authentication certificate CERT.XX.ECKA
  Generate a one-time shared key ShSe by using the asymmetric keys ePK.XX.ECKA and eSK.eUICC.ECKA Generate a session key or a session key set of an SCP03 session by using the static shared key ShSs and the one-time shared key ShSe Generate a receipt In operation 624, the eUICC may allow the asymmetric key ePK.eUICC.ECKA and the receipt to be included in a MUTUAL AUTHENTICATE Response and may transmit the MUTUAL AUTHENTICATE Response to the LPA. The LPA may transmit the MUTUAL AUTHENTICATE Response to the terminal secure area.

In operation 626, when receiving the MUTUAL AUTHENTICATE Response, the TEE that is the terminal secure area may verify the receipt and a generate an SCP03 session key or an SCP03 session key set.

In operation 628, the TEE that is the terminal secure area may transmit, to the LPA, a message indicating that generation is completed as a response to an SCP11a secure channel generating request and at least one of the generated S-ENC, S-MAC, and R-MAC keys.

In operation 630, the LPA may allow the following ES10 commands to be included in a Store Data APDU, and then may perform SCP03 protection.

Get Euicc Configured Addresses
Set Default Dp Address
Prepare Download
Load Bound Profile Package
Get EUICC Challenge
Get EUICC Info
List Notification
Retrieved NotificationList
Remove Notification From List
Load CRL
Authenticate Server
Cancel Session
Get Profiles Info
Enable Profile
Disable Profile
Delete Profile
eUICC Memory Reset
Get EID
Set Nickname
Get RAT In operation 632, the LPA may transmit "Store Data" command that is SCP03 protected to the eUICC.

In operation 634, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 636, when no failure occurs in the verification or the decryption, the eUICC may process content of the "Store Data" command.

In operation 638, the eUICC may perform SCP03 protection on an APDU response message.

In operation 640, the eUICC may transmit the APDU response message that is SCP03 protected to the LPA.

In operation 642, the LPA may decrypt the APDU response message that is SCP03 protected by using at least one of the S-ENC and R-MAC keys and then may extract and process the APDU response message.

The LPA may use a security function provided by the terminal secure area when transmitting an ES10 message used to download a profile or read information of the eUICC to the eUICC, by repeating the above process of FIG. 6.

Figure 7:
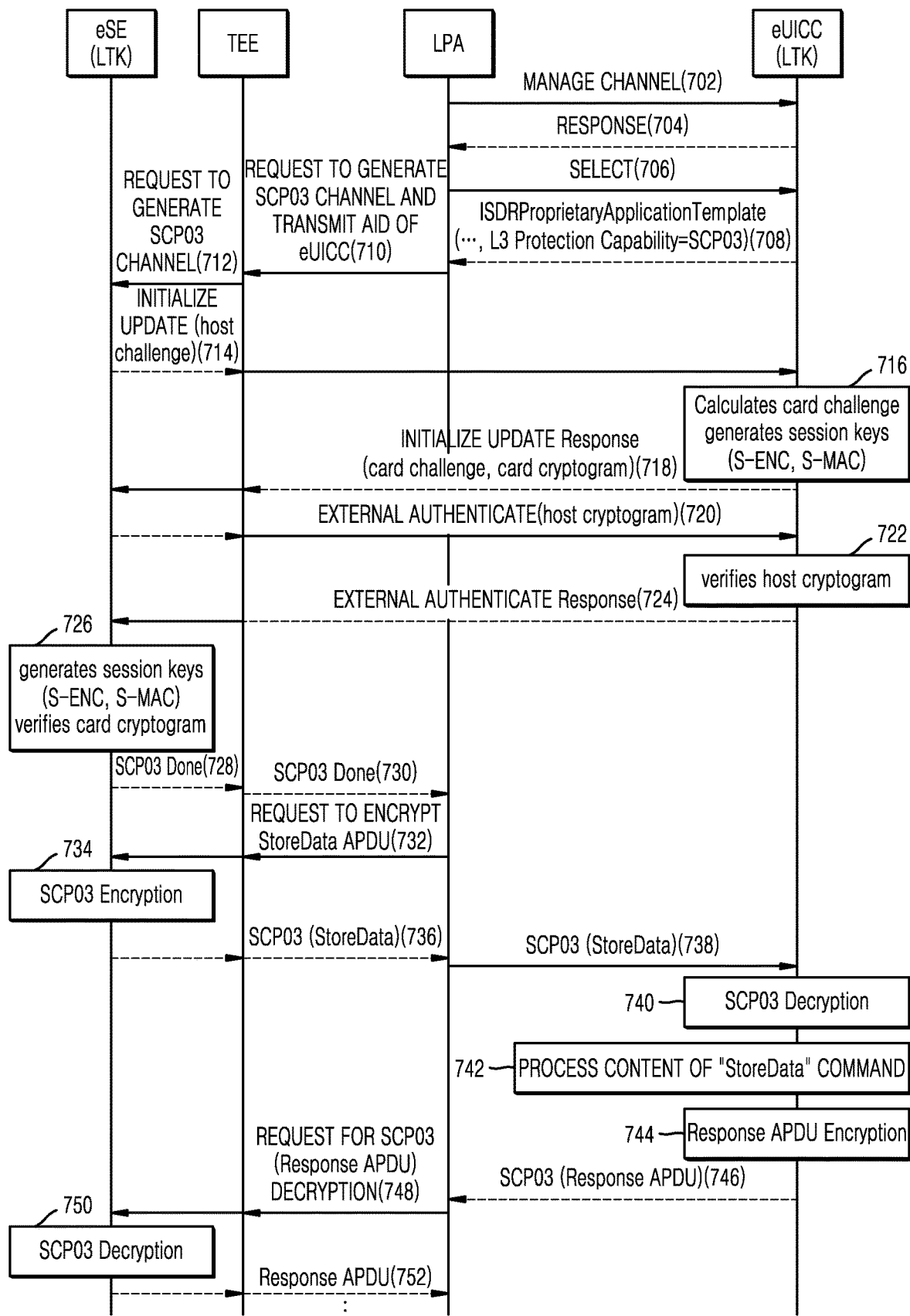
FIG. 7 is an exemplary flowchart of controlling access of the LPA in the eUICC according to another embodiment.

FIG. 7 is a flowchart of a method of controlling access of the LPA in the eUICC according to another embodiment.

In operation 702, the LPA may transmit a "MANAGE CHANNEL" APDU command to the eUICC.

In operation 704, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 706, the LPA may select an ISD-R corresponding to a secure area of the eUICC by using a "SELECT" command. In operation 708, the eUICC may transmit an ISDRProprietaryApplicationTemplate including information about an L3 protection capability to the LPA as a reply. The L3 protection capability may include information indicating whether to support a secure channel forming function of the eUICC or specifying a supported secure channel. Even when the L3 protection capability is not included in the ISDRProprietaryApplicationTemplate, the LPA may use a pre-determined secure channel forming method and a secret key suitable for the pre-determined secure channel forming method. It is assumed that the L3 protection capability supports SCP03 in the present embodiment.

In operation 710, the LPA may request the TEE that is the terminal secure area to generate an SCP03 secure channel. In this case, an AID of the eUICC ISD-R may be transmitted to the TEE.

In operation 712, the terminal secure area may request the eSE that is the HW secure area to generate an SCP03 channel.

In operation 714, the eSE that is the HW secure area may generate a host challenge and may transmit an INITIALIZE UPDATE APDU including the host challenge through the terminal secure area and the LPA to the eUICC. In this case, the LPA may transmit the INITIALIZE UPDATE APDU to the selected ISD-R and the pre-generated logical channel. According to another embodiment, the HW secure area may transmit the INITIALIZE UPDATE APDU without passing through the LPA. In this case, the HW secure area may make preparation for transmitting the INITIALIZE UPDATE APDU to the eUICC by using a "MANAGE CHANNEL" command and a "SELECT" command directly or through an entity in another terminal (e.g., the terminal secure area). In the following process, it is assumed that APDU message exchange with the eUICC is performed through the LPA for better understanding.

In operation 716, the eUICC may generate a session key or a session key set of an SCP03 session by using at least one of a card challenge value that is internally generated, the received host challenge, a sequence counter value, and an SCP03 symmetric key that is stored in the eUICC. The session key or the session key set may include at least one of the following.

An S-ENC key for encryption/decryption
An S-MAC key for integrity protection of a message sent by the LPA
An R-MAC key for integrity protection of a response message sent by the eUICC Also, the eUICC may generate a card cryptogram used for verification of mutual authentication between the eUICC and the LPA.

In operation 718, the eUICC may allow the generated card cryptogram and a card challenge to be included in an INITIALIZE UPDATE Response and may transmit the INITIALIZE UPDATE Response to the LPA. The LPA may transmit the received INITIALIZE UPDATE Response to the TEE that is the terminal secure area. Also, the TEE that is the terminal secure area may transmit the received INITIALIZE UPDATE Response to the eSE that is the HW secure area. However, this is an example, and according to another embodiment, a sequence counter may be further included in the INITIALIZE UPDATE Response.

In operation 720, the eSE that is the HW secure area may allow a host cryptogram generated by using the SCP03 symmetric key to be included in an EXTERNAL AUTHENTICATE APDU message and may transmit the EXTERNAL AUTHENTICATE APDU message through the terminal secure area and the LPA to the eUICC so that the eUICC authenticates the HW secure area.

The HW secure area may verify the received card cryptogram by using an SCP03 symmetric key that is stored in the HW secure area. Also, the HW secure area may generate a session key or a session key set of the SCP03 session that is the same as that generated by the eUICC by using the SCP03 symmetric key, the card challenge, the host challenge, and the sequence counter.

After the card cryptogram passes the verification and the session key is generated, the HW secure area may generate the host cryptogram by using the SCP03 symmetric key. In operation 722, the eUICC may verify the host cryptogram received from the LPA and may confirm that the LPA has a valid SCP03 symmetric key.

In operation 724, the eUICC may transmit an EXTERNAL AUTHENTICATE Response to the LPA to generate an SCP03 secure channel, and may notify the LPA that preparation has been made. The LPA may transmit the EXTERNAL AUTHENTICATE Response through the terminal secure area to the HW secure area.

In operation 726, the eSE that is the HW secure area may generate a session key including at least one of the S-ENC and S-MAC keys and may verify the card cryptogram.

In operation 728, the eSE that is the HW secure area may transmit, to the TEE that is the terminal secure area, a message indicating that generation is completed as a response to an SCP03 secure channel generating request.

In operation 730, the TEE that is the terminal secure area may transmit, to the LPA, the message indicating that generation is completed.

In operation 732, the LPA may allow the following ES10 commands to be included in a Store Data APDU, and may transmit the Store Data APDU through the terminal secure area to the HW secure area.

Get Euicc Configured Addresses
Set Default Dp Address
Prepare Download
Load Bound Profile Package
Get EUICC Challenge
Get EUICC Info
List Notification
Retrieved Notification List
Remove Notification From List
Load CRL
Authenticate Server
Cancel Session
Get Profiles Info
Enable Profile
Disable Profile
Delete Profile
eUICC Memory Reset
Get EID
Set Nickname
Get RAT In operation 734, the eSE that is the HW secure area may perform SCP03 protection on the received Store Data APDU.

In operation 736, the eSE that is the HW secure area may transmit a "Store Data" command that is SCP03 protected to the LPA.

In operation 738, the LPA may transmit the "Store Data" command that is SCP03 protected to the eUICC.

In operation 740, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 742, when no failure occurs in the verification or the decryption, the eUICC may process content of the "Store Data" command.

In operation 744, the eUICC may perform SCP03 protection on an APDU response message.

In operation 746, the eUICC may transmit the APDU response message that is SCP03 protected to the LPA.

In operation 748, the LPA may transmit the APDU response message that is SCP03 protected to the HW secure area and may request the HW secure area for SCP03 decryption.

In operation 750, the TEE that is the HW secure area may perform SCP03 decryption by using at least one of the generated S-ENC and R-MAC keys.

In operation 752, the TEE that is the HW secure area may transmit the APDU response message to the LPA.

The LPA may use a security function provided by the HW secure area when transmitting an ES10 message used to download a profile or read information of the eUICC to the eUICC, by repeating the above process of FIG. 7.

Figure 8:
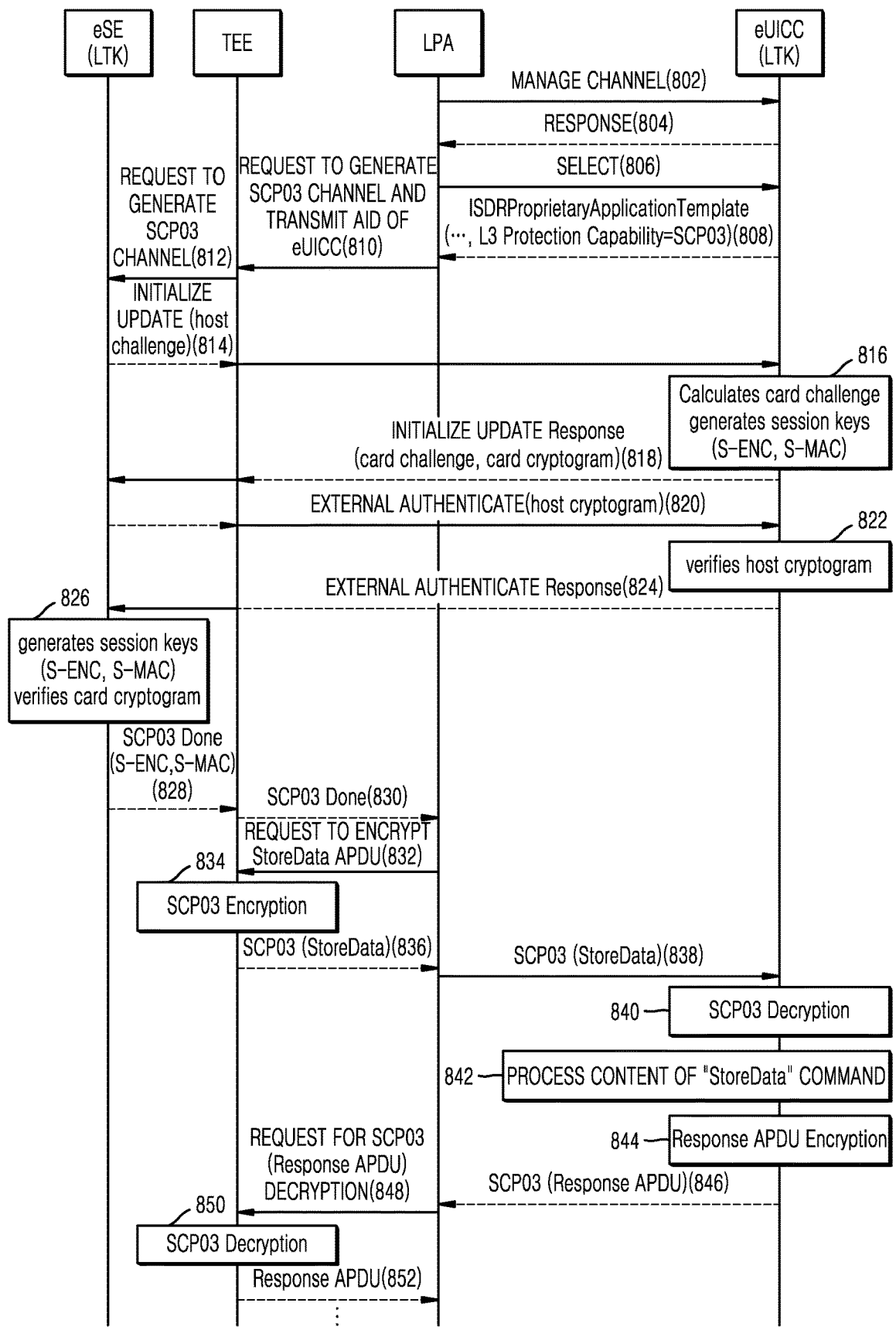
FIG. 8 is an exemplary flowchart of controlling access of the LPA in the eUICC according to another embodiment.

FIG. 8 is a flowchart of a method of controlling access of the LPA in the eUICC according to another embodiment.

In operation 802, the LPA may transmit "MANAGE CHANNEL" APDU command to the eUICC.

In operation 804, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated. In operation 806, the LPA may select an ISD-R corresponding to a secure area of the eUICC by using a "SELECT" command.

In operation 808, the eUICC may transmit an ISDR Proprietary Application Template including information about an L3 protection capability to the LPA as a reply. The L3 protection capability may include information indicating healer to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. In the present embodiment, it is assumed that the L3 protection capability supports SCP03.

In operation 810, the LPA requests the TEE that is the terminal secure area to generate an SCP03 secure channel. In this case, an AID of the eUICC ISD-R may be transmitted.

In operation 812, the TEE that is the terminal secure area may request the eSE that is the HW secure area to generate an SCP03 channel.

In operation 814, the eSE that is the HW secure area may generate a host challenge and may transmit an INITIALIZE UPDATE APDU including the host challenge through the terminal secure area and the LPA to the eUICC. In this case, the LPA may transmit the INITIALIZE UPDATE APDU to the selected ISD-R and the pre-generated logical channel. According to another embodiment, the HW secure area may transmit the INITIALIZE UPDATE APDU without passing through the LPA. In this case, the HW secure area may make preparation for transmitting the INITIALIZE UPDATE APDU to the eUICC by using a "MANAGE CHANNEL" command and a "SELECT" command directly or through an entity in another terminal (e.g., the terminal secure area). In the following process, it is assumed that APDU message exchange with the eUICC is performed through the LPA for better understanding.

In operation 816, the eUICC may generate a session key or a session key set of an SCP03 session by using at least one of a card challenge value that is internally generated, the received host challenge, a sequence counter value, and an SCP03 symmetric key that is stored in the eUICC. The session key or the session key set may include at least one of the following.

An S-ENC key for encryption/decryption
An S-MAC key for integrity protection of a message sent by the LPA
An R-MAC key for integrity protection of a response message sent by the eUICC Also, the eUICC may generate a card cryptogram used for verification of mutual authentication between the eUICC and the LPA.

In operation 818, the eUICC may allow the generated card cryptogram and a card challenge to be included in an INITIALIZE UPDATE Response and may transmit the INITIALIZE UPDATE Response to the LPA. The LPA may transmit the received INITIALIZE UPDATE Response to the TEE that is the terminal secure area. However, this is an example, and according to another embodiment, a sequence counter may be further included in the INITIALIZE UPDATE Response.

Also, the terminal secure area may transmit the received INITIALIZE UPDATE Response to the HW secure area.

In operation 820, the eSE that is the HW secure area may allow a host cryptogram generated by using an SCP03 symmetric key to be included in an EXTERNAL AUTHENTICATE APDU message and may transmit the EXTERNAL AUTHENTICATE APDU message through the terminal secure area and the LPA to the eUICC so that the eUICC authenticates the HW secure area.

The HW secure area may verify the received card cryptogram by using an SCP03 symmetric key that is stored in the HW secure area. Also, the HW secure area may generate a session key or a session key set of the SCP03 session that is the same as that generated by the eUICC by using the SCP03 symmetric key, the card challenge, the host challenge, and the sequence counter.

After the card cryptogram passes the verification and the session key is generated, the HW secure area may generate the host crypt g am by using the SCP03 symmetric key In operation 822, the eUICC may verify the host cryptogram received from the LPA and may confirm that the LPA has a valid SCP03 symmetric key.

In operation 824, the eUICC may transmit an EXTERNAL AUTHENTICATE Response to the LPA to generate an SCP03 secure channel, and may notify the LPA that preparation has been made.

The LPA may transmit the EXTERNAL AUTHENTICATE Response through the terminal secure area to the HW secure area.

In operation 826, the eSE that is the FEW secure area may generate a session key including at least one of the S-ENC and S-MAC keys and may verify the card cryptogram.

In operation 828, the eSE that is the HW secure area may transmit, to the TEE that is the terminal secure area, a message indicating that generation completed as a response to an SCP03 secure channel generating request. In this case, at least one of the S-ENC and S-MAC keys may be transmitted to the terminal secure area.

In operation 830, the TEE that is the terminal secure area may transmit, to the LPA, the message indicating that generation is completed.

In operation 832, the LPA may allow the following ES10 commands to be included in a Store Data APDU, and may transmit the Store Data APDU to the terminal secure area.

Get Euicc Configured Addresses
Set Default Dp Address
Prepare Download
Load Bound Profile Package
Get EUICC Challenge
Get EUICC Info
List Notification
Retrieved Notification List
Remove Notification From List
Load CRL
Authenticate Server
Cancel Session
Get Profiles Info
Enable Profile
Disable Profile
Delete Profile
eUICC Memory Reset
Get EID
Set Nickname
Get RAT In operation 834, the TEE that is the terminal secure area may perform SCP03 protection on the received Store Data APDU.

In operation 836, the TEE that is the terminal secure area may transmit a "Store Data" command that is SCP03 protected to the LPA.

In operation 838, the may transmit the "Store Data" command that is SCP03 protected to the eUICC.

In operation 840, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 842, when no failure occurs in the verification or the decryption, the eUICC may process content of the "Store Data" command.

In operation 844, the eUICC may perform SCP03 protection on an APDU response message.

In operation 846, the eUICC may transmit the APDU response message that is SCP03 protected to the LPA.

In operation 848, the LPA may transmit the APDU response message that is SCP03 protected to the terminal secure area for SCP03 decryption.

In operation 850, the TEE that is the terminal secure area may perform decryption by using at least one of the S-ENC and R-MAC keys.

In operation 852, the TEE that is the terminal secure area may transmit the APDU response message to the LPA.

The LPA may use a security function provided by the secure area and the terminal secure area when transmitting an ES10 message used to download a profile or read information of the eUICC to the eUICC, by repeating the above process of FIG. 8.

Figure 9:
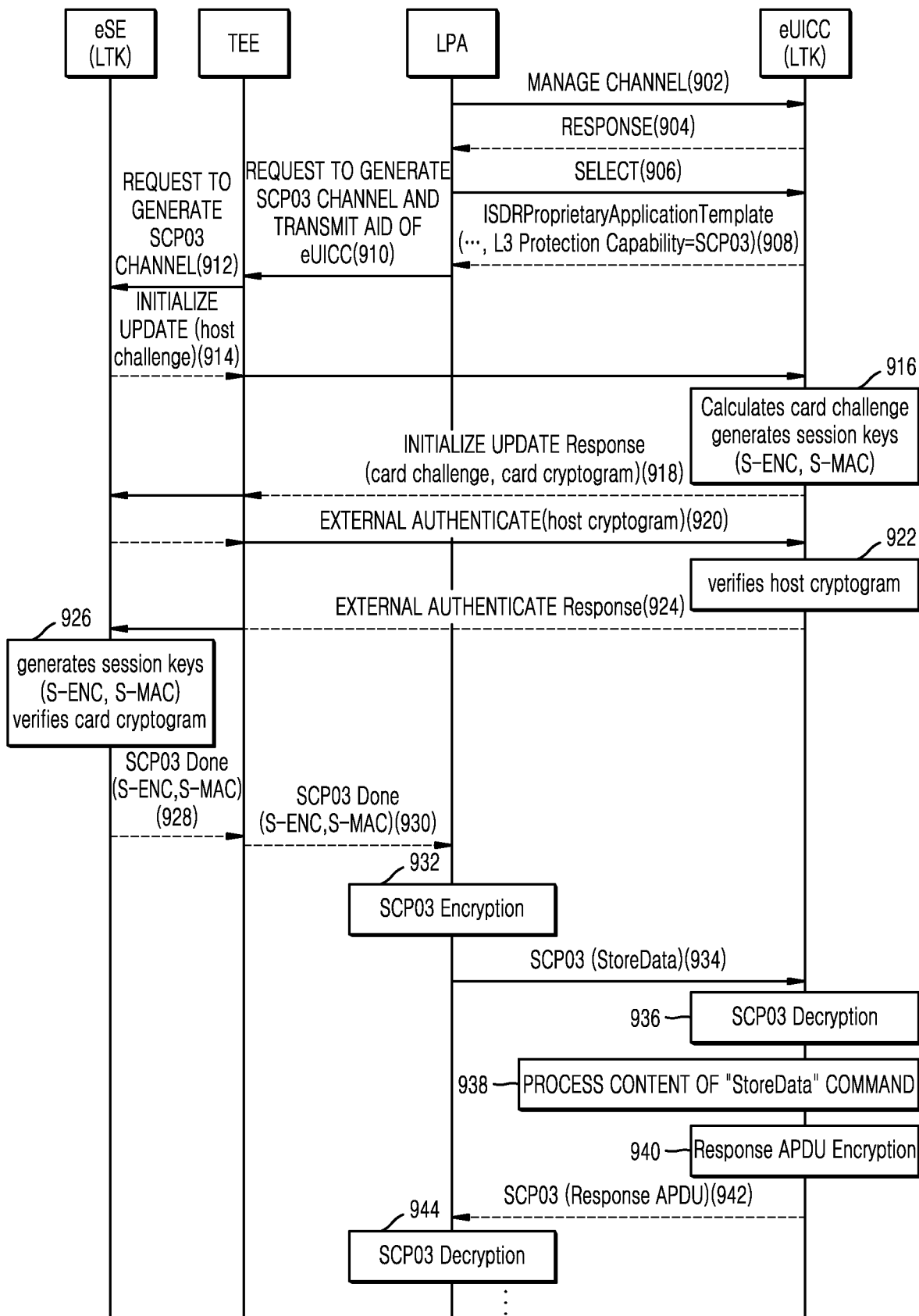
FIG. 9 is an exemplary flowchart of controlling access of the LPA in the eUICC according to another embodiment.

FIG. 9 is a flowchart of a method of controlling access of the LPA in the eUICC according to another embodiment.

In operation 902, the LPA may transmit a "MANAGE CHANNEL" APDU command to the eUICC.

In operation 904, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 906, the LPA may select an ISD-R corresponding to a secure area of the eUICC by using a "SELECT" command.

In operation 908, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDRProprietaryApplicationTemplate, the LPA may use a pre-determined secure channel forming method and a secret key suitable for the pre-determined secure channel forming method. In the present embodiment, is assumed that the L3 protection capability supports SCP03.

In operation 910, the LPA requests the TEE that is the terminal secure area to generate an SCP03 secure channel. In this case, an AID of the eUICC ISD-R may be transmitted to the TEE.

In operation 912, the terminal secure area may request the eSE that is the HW secure area to generate an SCP03 channel.

In operation 914, the eSE that is the HW secure area may generate a host challenge and may transmit an INITIALIZE UPDATE APDU including the host challenge through the terminal secure area and the LPA to the eUICC. In this case, the LPA may transmit the INITIALIZE UPDATE APDU to the selected ISD-R and the pre-generated logical channel. According to another embodiment, the HW secure area may transmit the INITIALIZE UPDATE APDU without passing through the LPA. In this case, the HW secure area may make preparation for transmitting the INITIALIZE UPDATE APDU to the eUICC by using a "MANAGE CHANNEL" command and a "SELECT" command directly or through an entity in another terminal (e.g., the terminal secure area). In the following process, it is assumed that APDU message exchange with the eUICC is performed through the LPA for better understanding.

In operation 916, the eUICC may generate a session key or a session key set of an SCP03 session by using at least one of a card challenge value that is internally generated, the received host challenge, a sequence counter value, and an SCP03 symmetric key that is stored in the eUICC. The session key or the session key set may include at least one of the following.

An S-ENC key for encryption/decryption
An S-MAC key for integrity protection of a message sent by the LPA
An R-MAC key for integrity protection of a response message sent by the eUICC Also, the eUICC may generate a card cryptogram used for verification of mutual authentication between the eUICC and the LPA.

In operation 918, the eUICC may allow the generated card cryptogram and a card challenge to be included in an INITIALIZE UPDATE Response and may transmit the INITIALIZE UPDATE Response to the LPA. The LPA may transmit the received INITIALIZE UPDATE Response to the TEE that is the terminal secure area.

Also, the TEE that is the terminal secure area may transmit the received INITIALIZE UPDATE Response to the eSE that is the HW secure area.

However, this is an example, and according to another embodiment, a sequence counter may be further included in the INITIALIZE UPDATE Response.

In operation 920, the eSE that is the HW secure area may allow a host cryptogram generated by using the SCP03 symmetric key to be included in an EXTERNAL AUTHENTICATE APDU message and may transmit the EXTERNAL AUTHENTICATE APDU message through the terminal secure area and the LPA to the eUICC so that the eUICC authenticates the HW secure area.

The HW secure area may verify the received card cryptogram by using an SCP03 symmetric key that is stored in the HW secure area. Also, the HW secure area may generate a session key or a session key set of the SCP03 session that is the same as that generated by the eUICC by using the SCP03 symmetric key, the card challenge, the host challenge, and the sequence counter.

After the card cryptogram passes the verification and the session key is generated, the HW secure area may generate the host cryptogram by using the SCP03 symmetric key.

In operation 922, the eUICC may verify the host cryptogram received from the LPA and may confirm that the LPA has a valid SCP03 symmetric key.

In operation 924, the eUICC may transmit an EXTERNAL AUTHENTICATE Response to the LPA to generate an SCP03 secure channel, and may notify the LPA that preparation has been made. The LPA may transmit the EXTERNAL AUTHENTICATE Response through the terminal secure area to the HW secure area.

In operation 926, the eSE that is the HW secure area may generate a session key including at least one of the S-ENC and S-MAC keys and may verify the card cryptogram.

In operation 928, the eSE that is the HW secure area may transmit, to the terminal secure area, a message indicating that generation completed as a response to an SCP03 secure channel generating request and at least one of the additionally generated S-ENC, S-MAC, and R-MAC keys.

In operation 930, the TEE that is the terminal secure area may transmit, to the LPA, the message indicating that generation is completed as a response to an SCP03 secure channel generating request and at least one of the additionally generated S-ENC, S-MAC, and R-MAC keys.

In operation 932, the LPA may allow the following ES10 commands to be included in a Store Data APDU, and may perform SCP03 protection.

Get Euicc Configured Addresses
Set Default Dp Address
Prepare Download
Load Bound Profile Package
Get EUICC Challenge
Get EUICC Info
List Notification
Retrieved Notification List
Remove Notification From List
Load CRL Authenticate Server
Cancel Session
Get Profiles Info
Enable Profile
Disable Profile
Delete Profile
eUICC Memory Reset
Get ED
Set Nickname
Get RAT In operation 934, the LPA may transmit a "Store Data" command that is protected to the eUICC.

In operation 936, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 938, when no failure occurs in the verification or the decryption, the eUICC may process content of the "Store Data" command.

In operation 940, the eUICC may perform SCP03 protection on an APDU response message.

In operation 942, the eUICC may transmit the APDU response message that is SCP03 protected to the LPA.

In operation 944, the LPA may perform decryption by using at least one of the S-ENC and R-MAC keys and then may extract and process the APDU response message.

The LPA may use a security function provided by the HW secure area and the terminal secure area when transmitting an ES10 message used to download a profile or read information of the eUICC to the eUICC, by repeating the above process of FIG. 9.

Figure 10:
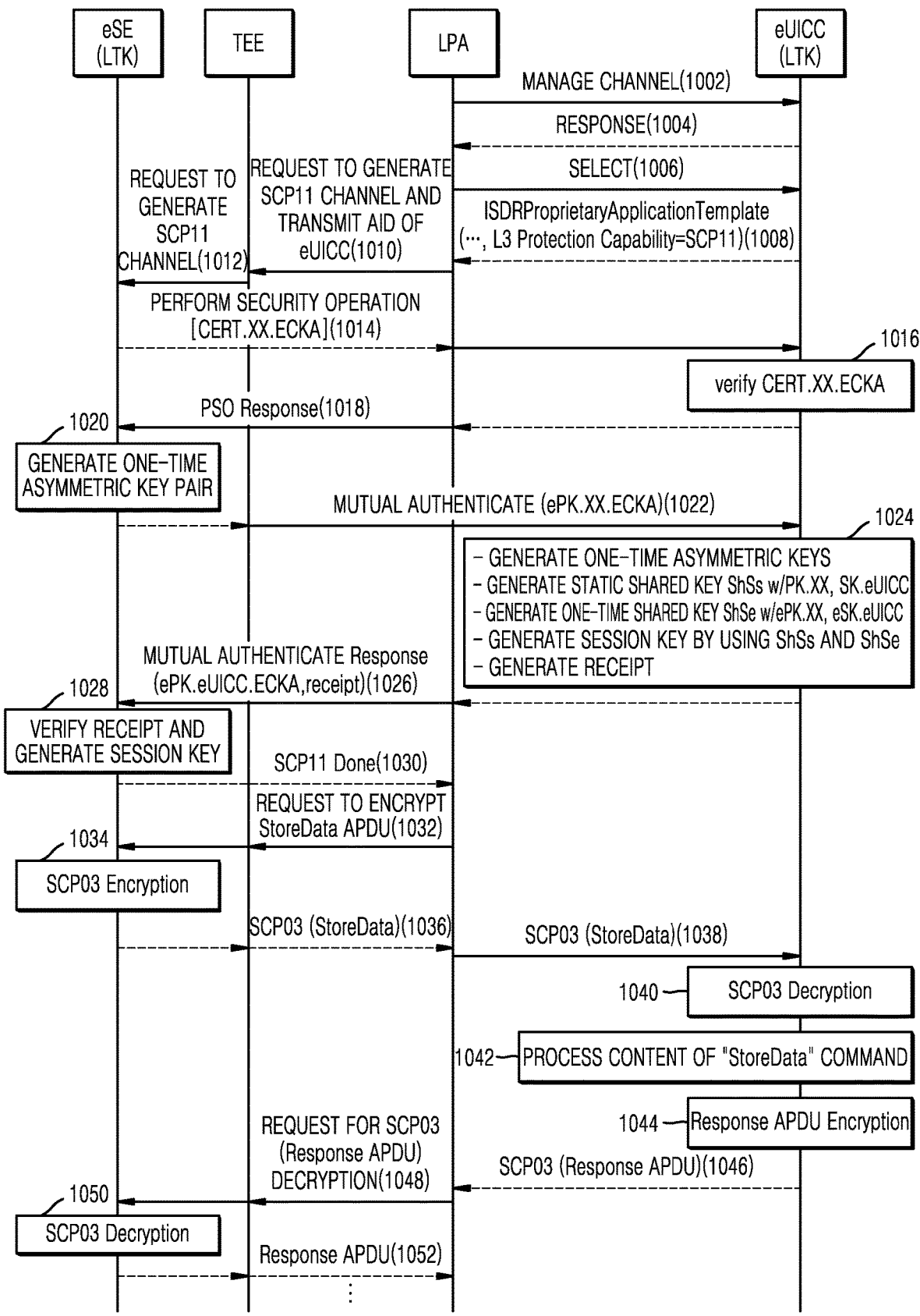
FIG. 10 is an exemplary flowchart of controlling access of the LPA in the eUICC according to another embodiment.

FIG. 10 is a flowchart of a method of controlling access of the LPA in the eUICC according to another embodiment.

In operation 1002, the LPA may transmit a "MANAGE CHANNEL" APDU command to the eUICC.

In operation 1004, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1006, the LPA may select an ISD-R corresponding to a secure area of the eUICC by using a "SELECT" command.

In operation 1008, the eUICC may transmit an ISDRProprietaryApplicationTemplate including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. Although the L3 protection capability may support SCP11a or SCP11b, it is assumed that the L3 protection capability supports SCP11a in the present embodiment.

In operation 1010, the LPA requests the TEE that is the terminal secure area to generate an SCP03 secure channel. In this case, an AID of the eUICC ISD-R may be transmitted to the TEE.

In operation 1012, the TEE that is the terminal secure area may request the eSE that is the HW secure area to generate an SCP11a channel.

In operation 1014, the eSE that is the HW secure area may transmit, to the eUICC, a PERFORM SECURITY OPERATION APDU including an authentication certificate CERT.XX.ECKA that is stored in the eSE. The PERFORM SECURITY OPERATION APDU may be transmitted through the terminal secure area and the LPA. In this case, the LPA may transmit the PERFORM SECURITY OPERATION APDU to the selected ISD-R and the pre-generated logical channel. According to another embodiment, the eSE that is the HW secure area may transmit the PERFORM SECURITY OPERATION APDU without passing through the LPA. In this case, the HW secure area may make preparation for transmitting the PERFORM SECURITY OPERATION APDU to the eUICC by using a "MANAGE CHANNEL" command and a "SELECT" command directly or through another entity. Although APDU command exchange may be performed through any path, it is assumed that an APDU is transmitted through the LPA for convenience of explanation.

In operation 1016, when receiving the PERFORM SECURITY OPERATION APDU, the eUICC may verify the authentication certificate CERT.XX.ECKA included in the PERFORM SECURITY OPERATION APDU. In this case, a CA certificate used to verify the authentication certificate CERT.XX.ECKA, or a public key, or information calculated with the public key may be stored in the eUICC.

In operation 1018, when the authentication certificate CERT.XX.ECKA passes the verification, the eUICC may transmit a PSO Response to the LPA, and the LPA may transmit the PSO Response to the terminal secure area. The terminal secure area may transmit the PSO Response to the HW secure area.

In operation 1020, the TEE that is HW secure area may generate a one-time asymmetric key pair.

The one-time asymmetric key pair may be ePK.XX.ECKA and eSK.XX.ECKA. XX may be a symbol for distinguishing an entity indicating an asymmetric key.

In operation 1022, the TEE that is the HW secure area may allow the generated asymmetric key ePK.XX.ECKA to be included in a MUTUAL AUTHENTICATE APDU and may transmit the MUTUAL AUTHENTICATE APDU through the LPA to the eUICC.

In operation 1024, the eUICC may receive the MUTUAL AUTHENTICATE APDU and may perform the following.
   Generate one-time asymmetric keys (ePK.eUICC.ECKA and eSK.eUICC.ECKA)
   Generate a static shared key ShSs by using an eUICC private key (SK.EUICC.ECKA) stored in the eUICC and a public key (PK.XX.ECKA) included in the authentication certificate CERT.XX.ECKA
   Generate a one-time shared key ShSe by using the asymmetric keys ePK.XX.ECKA and eSK.eUICC.ECKA
   Generate a session key or a session key set of an SCP03 session by using the static shared key ShSs and the one-time shared key ShSe
   Generate a receipt In operation 1026, the eUICC may allow the asymmetric key ePK.eUICC.ECKA and the receipt to be included in a MUTUAL AUTHENTICATE Response and may transmit the MUTUAL AUTHENTICATE Response to the LPA. The LPA may transmit the MUTUAL AUTHENTICATE Response to the terminal secure area. The terminal secure area may transmit the MUTUAL AUTHENTICATE Response to the HW secure area.

In operation 1028, when receiving the MUTUAL AUTHENTICATE Response, the eSE that is the HW secure area may verify the receipt and may generate an SCP03 session key or an SCP03 session key set In operation 1030, the eSE that is the HW secure area may transmit, to the terminal secure area, a message indicating that generation is completed as a response to an SCP11a secure channel generating request. The TEE that is the terminal secure area may transmit, to the LPA, the message indicating that generation is completed as a response to an SCP11a secure channel generating request.

In operation 1032, the LPA may allow the following ES10 commands to be included in a Store Data APDU, and then may transmit the Store Data APDU to the terminal secure area. The terminal secure area may transmit the received Store Data APDU to the HW secure area.
  Get Euicc Configured Addresses
  Set Default Dp Address
  Prepare Download
  Load Bound Profile Package
  Get EUICC Challenge
  Get EUICC Info
  List Notification
  Retrieved Notification List
  Remove Notification From List In operation 1034, the eSE that is the HW secure area may add SCP03 protection to the received Store Data APDU, and may transmit a "Store Data" command that is SCP03 protected to the terminal secure area.

In operation 1036, the TEE that is the terminal secure area may transmit the "Store Data" command that is SCP03 protected to the LPA.

In operation 1038, the LPA may transmit the "Store Data" command that is SCP03 protected to the eUICC.

In operation 1040, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 1042, when no failure occurs in the verification or the decryption, the eUICC may process content of the "Store Data" command.

In operation 1044, the eUICC may perform SCP03 protection on an APDU response message.

In operation 1046, the eUICC may transmit an APDU response message that is SCP03 protected to the LPA.

In operation 1048, the LPA may transmit the APDU response message that is SCP03 protected to the terminal secure area and may request the terminal secure area for SCP03 decryption. The terminal secure area may transmit the APDU response message that is SCP03 protected to the HW secure area and may request the HW secure area for SCP03 decryption.

In operation 1050, the eSE that is the HW secure area may perform at least one of integrity decryption and decryption by using at least one of the generated S-ENC and R-MAC keys.

In operation 1052, the eSE that is the HW secure area may transmit the APDU response message to the LPA.

The LPA may use a security function provided by the HW secure area when transmitting an ES10 message used to download a profile or read information of the eUICC to the eUICC, by repeating the above process of FIG. 10.

Figure 11:
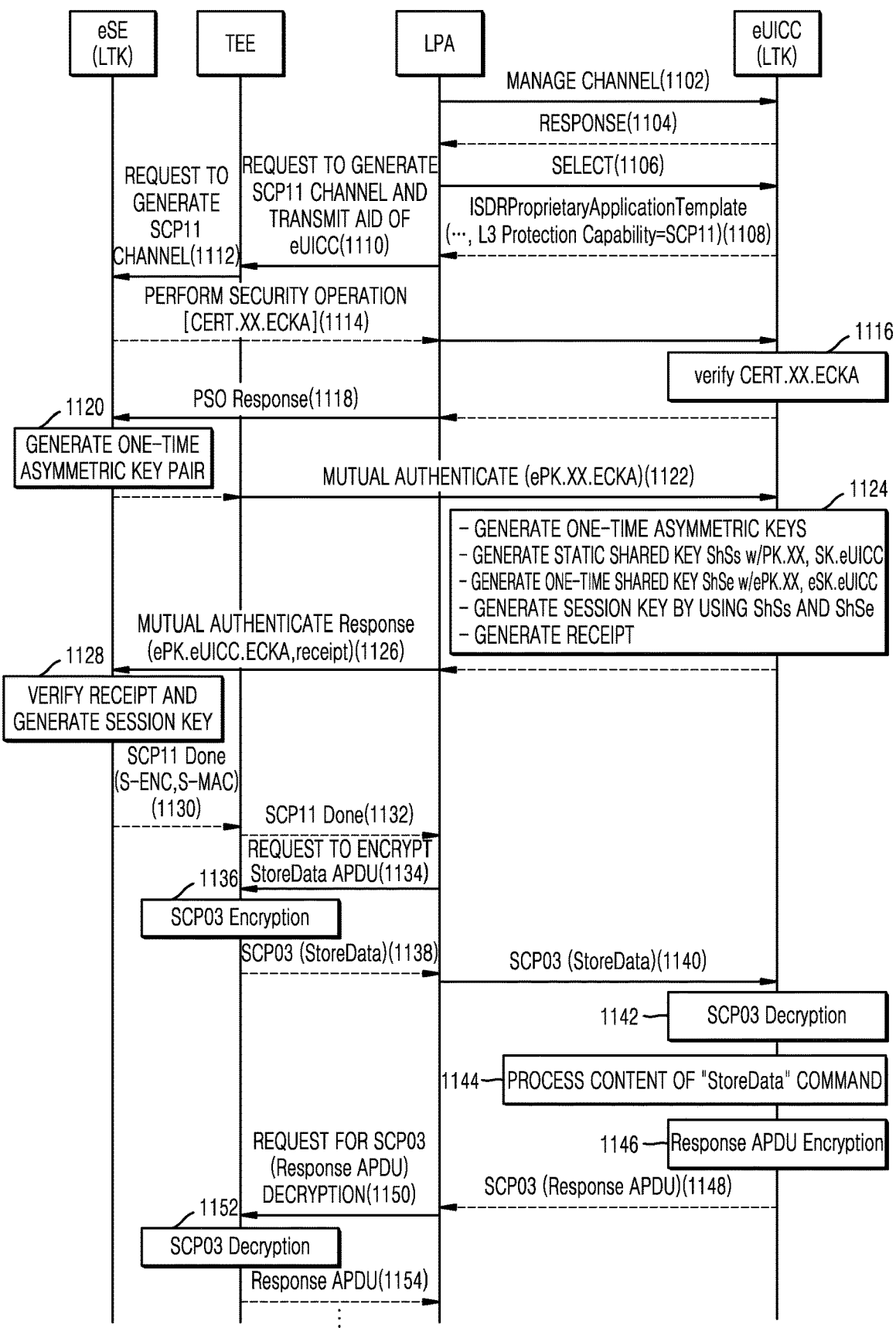
FIG. 11 is an exemplary flowchart of controlling access of the LPA in the eUICC according to another embodiment.

FIG. 11 is a flowchart of a method of controlling access of the LPA in the eUICC according to another embodiment. In operation 1102, the LPA may transmit a "MANAGE CHANNEL" APDU command to the eUICC.

In operation 1104, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1106, the LPA may select an ISD-R corresponding to a secure area of the eUICC by using a "SELECT" command.

In operation 1108, the eUICC may transmit an ISDRProprietaryApplicationTemplate including information about an L3 protection capability to the LPA as a reply. The L3 protection capability may include information indicating whether to support a secure channel forming function of the eUICC or specifying a supported secure channel. Even when the L3 protection capability is not included in the ISDRProprietaryApplicationTemplate, the LPA may use a pre-determined secure channel forming method and a secret key suitable for the pre-determined secure channel forming method. Although the L3 protection capability may support SCP11a or SCP11b, it is assumed that the L3 protection capability supports SCP11a in the present embodiment.

In operation 1110, the LPA may request the TEE that is the terminal secure area to generate an SCP11a secure channel. In this case, an AID of the eUICC ISD-R may be transmitted.

In operation 1112, the TEE that is the terminal secure area may request the eSE that is the HW secure area to generate an SCP11A channel.

In operation 1114, the eSE that is the HW secure area may transmit, to the eUICC, a PERFORM SECURITY OPERATION APDU including an authentication certificate CERT.XX.ECKA that is stored in the eSE. The PERFORM SECURITY OPERATION APDU may be transmitted through the terminal secure area and the LPA. In this case, the LPA may transmit the PERFORM SECURITY OPERATION APDU to the selected ISD-R and the pre-generated logical channel. According to another embodiment, the HW secure area may transmit the PERFORM SECURITY OPERATION APDU without passing through the LPA. In this case, the HW secure area may make preparation for transmitting the PERFORM SECURITY OPERATION APDU to the eUICC by using a "MANAGE CHANNEL" command and a "SELECT" command directly or through another entity. Although APDU command exchange may be performed through any path, it is assumed that an APDU is transmitted through the LPA for convenience of explanation.

In operation 1116, when receiving the PERFORM SECURITY OPERATION APDU, the eUICC may verify the authentication certificate CERT.XX.ECKA included in the received PERFORM SECURITY OPERATION APDU. In this case, a CA certificate used to verify the authentication certificate CERT.XX.ECKA, a public key, or information calculated with the public key may be stored in the eUICC.

In operation 1118, when the authentication certificate CERT.XX.ECKA passes the verification, the eUICC may transmit a PSO Response to the LPA, and the LPA may transmit the PSO Response to the TEE that is the terminal secure area. The terminal secure area may transmit the PSO Response to the eSE that is the HW secure area.

In operation 1120, the eSE that is the HW secure area may generate a one-time asymmetric key pair. The one-time asymmetric key pair may be ePK.XX.ECKA and eSK.XX.ECKA. XX may be a symbol for distinguishing an entity indicating an asymmetric key.

In operation 1122, the eSE that is the HW secure area may allow the generated asymmetric key ePK.XX.ECKA to be included in a MUTUAL AUTHENTICATE APDU and may transmit the MUTUAL AUTHENTICATE APDU through the LPA to the eUICC.

In operation 1124, the eUICC may receive the MUTUAL AUTHENTICATE APDU and may perform the following.
- Generate one-time asymmetric keys (ePK.eUICC.ECKA and eSK.eUICC.ECKA)
- Generate a static shared key ShSs by using an eUICC private key (SK.EUICC.ECKA) stored in the eUICC and a public key (PK.XX.ECKA) included in the authentication certificate CERT.XX.ECKA
- Generate a one-time shared key ShSe by using the asymmetric keys ePK.XX.ECKA and eSK.eUICC.ECKA A
- Generate a session key or a session key set of an SCP03 session by using the static shared key ShSs and the one-time shared key ShSe
- Generate a receipt In operation 1126, the eUICC may allow the asymmetric key ePK.eUICC.ECKA and the receipt to be included in a MUTUAL AUTHENTICATE Response and may transmit the MUTUAL AUTHENTICATE Response to the LPA. The LPA may transmit the MUTUAL AUTHENTICATE Response to the terminal secure area. The terminal secure area may transmit the MUTUAL AUTHENTICATE Response to the HW secure area.

In operation 1128, when receiving the MUTUAL AUTHENTICATE Response, the eSE that is the HW secure area may verify the receipt and may generate an SCP03 session key or an SCP03 session key set.

In operation 1130, the eSE that is the HW secure area may transmit, to the terminal secure area, information indicating that generation is completed as an SCP11a secure channel generating request and a session key or a session key set.

In operation 1132, the TEE that is the terminal secure area may transmit, to the LPA, a message indicating that generation is completed as a response to an SCP11a secure channel generating request.

In operation 1134, the LPA may allow the following ES10 commands in a Store Data APDU, and then may transmit the Store Data APDU to the terminal secure area.
- Get Euicc Configured Addresses
- Set Default Dp Address
- Prepare Download
- Load Bound Profile Package
- Get EUICC Challenge
- Get EUICC Info
- List Notification
- Retrieved Notification List
- Remove Notification From List
- Load CRL
- Authenticate Server
- Cancel Session
- Get Profiles Info
- Enable Profile
- Disable Profile
- Delete Profile
- eUICC Memory Reset
- Get EID
- Set Nickname
- Get RAT In operation 1136, the TEE that is the terminal secure area may perform SCP03 protection on the received Store Data APDU.

In operation 1138, the TEE that is the terminal secure area may transmit a "Store Data" command that is SCP03 protected to the LPA.

In operation 1140, the LPA may transmit the "Store Data" command that is SCP03 protected to the eUICC.

In operation 1142, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 1144, when no failure occurs in the verification or the decryption, the eUICC may process content of the "Store Data" command.

In operation 1146, the eUICC may perform SCP03 protection on an APDU response message.

In operation 1148, the eUICC may transmit the APDU response message that is SCP03 protected to the LPA.

In operation 1150, the LPA may transmit the APDU response message that is SCP03 protected to the terminal secure area and may request the terminal secure area for SCP03 decryption.

In operation 1052, the TEE that is the terminal secure area may perform at least one of verification and decryption by using at least one of the generated S-ENC and R-MAC keys.

In operation 1154, the TEE that is the terminal secure area may transmit the APDU response message to the LPA.

The LPA may use a security function provided by at least one of the HW secure area and the terminal secure area when transmitting an ES10 message used to download a profile or read information of the eUICC to the eUICC, by repeating the above process of FIG. 11.

Figure 12:
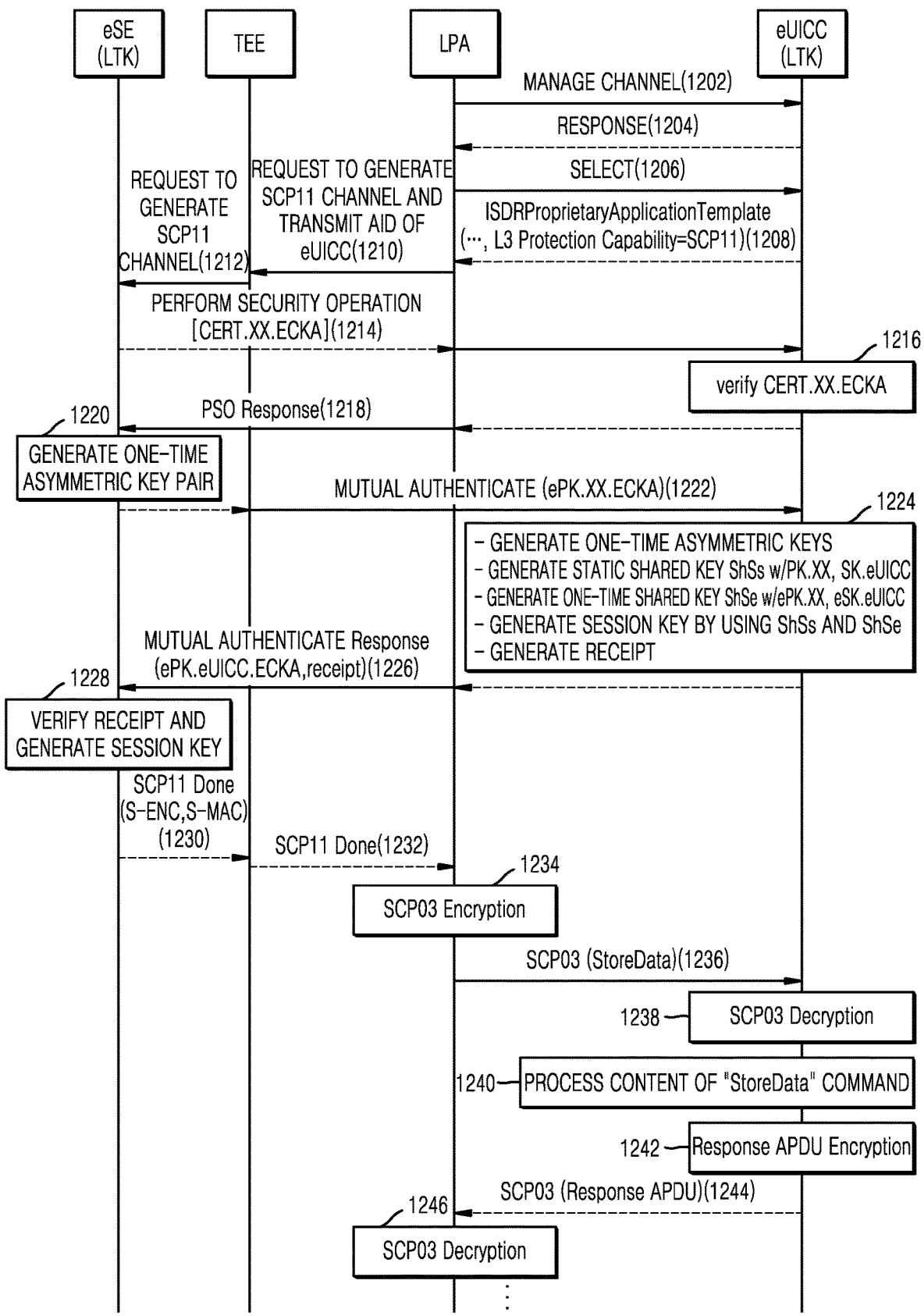
FIG. 12 is an exemplary flowchart of controlling access of the LPA in the eUICC according to another embodiment.

FIG. 12 is a flowchart of a method of controlling access of the LPA in the eUICC according to another embodiment.

In operation 1202, the LPA may transmit a "MANAGE CHANNEL" APDU command to the eUICC.

In operation 1204, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1206, the LPA may select an ISD-R corresponding to a secure area of the eUICC by using a "SELECT" command.

In operation 1208, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a pre-determined secure channel forming method and a secret key suitable for the pre-determined secure channel forming method. Although the L3 protection capability may support SCP11a or SCP11b, it is assumed that the L3 protection capability supports SCP11a in the present embodiment.

In operation 1210, the LPA may request the TEE that is the terminal secure area to generate an SCP11a secure channel. In this case, an AID of the eUICC ISD-R may be transmitted.

In operation 1212, the TEE that is the terminal secure area may request the eSE that is the HW secure area to generate an SCP11a channel.

In operation 1214, the eSE that is the HW secure area may transmit, to the eUICC, a PERFORM SECURITY OPERATION APDU including an authentication certificate CERT.XX.ECKA that is stored in the eSE. The PERFORM SECURITY OPERATION APDU may be transmitted through the terminal secure area and the LPA. In this case, the LPA may transmit the PERFORM SECURITY OPERATION APDU to the selected ISD-R and the pre-generated logical channel. According to another embodiment, the HW secure area may transmit the PERFORM SECURITY OPERATION APDU without passing through the LPA. In this case, the HW secure area may make preparation for transmitting the PERFORM SECURITY OPERATION APDU to the eUICC by using a "MANAGE CHANNEL" command and a "SELECT" command directly or through another entity. Although APDU command exchange may be performed through any path, it is assumed that an APDU is transmitted through the LPA for convenience of explanation In operation 1216, when receiving the PERFORM SECURITY OPERATION APDU, the eUICC may verify the authentication certificate CERT.XX.ECKA included in the PERFORM SECURITY OPERATION APDU. In this case, a CA certificate used to verify the authentication certificate CERT.XX.ECKA, a public key, or information calculated with the public key may be stored in the eUICC.

In operation 1218, when the authentication certificate CERT.XX.ECKA passes the verification, the eUICC may transmit a PSO Response to the LPA, and the LPA may transmit the PSO Response to the terminal secure area. The terminal secure area may transmit the PSO Response to the HW secure area.

In operation 1220, the eSE that is the HW secure area may generate a one-time asymmetric key pair.

The one-time asymmetric key pair may be ePK.XX.ECKA and eSK.X.X.ECKA. XX may be a symbol for distinguishing an entity indicating an asymmetric key.

In operation 1222, the eSE that is the HW secure area may allow the generated asymmetric key ePK.XX.ECKA to be included in a MUTUAL AUTHENTICATE APDU and may transmit the MUTUAL AUTHENTICATE APDU through the LPA to the eUICC.

In operation 1224, the eUICC may receive the MUTUAL AUTHENTICATE APDU and may perform the following.
   Generate one-time asymmetric keys (ePK.eUICC.ECKA and eSK.eUICC.ECKA)
   Generate a static shared key ShSs by using an eUICC private key (SK.EUICC.ECKA) stored in the eUICC and a public key (PK.XX.ECKA) included in the authentication certificate CERT.XX.ECKA
   Generate a one-time shared key ShSe by using the asymmetric keys ePK.XX.ECKA and eSK.eUICC.ECKA
   Generate a session key or a session key set of an SCP03 session by using the static shared key ShSs and the one-time shared key ShSe
   Generate a receipt In operation 1226, the eUICC may allow the asymmetric key ePK.eUICC.ECKA and the receipt to be included in a MUTUAL AUTHENTICATE Response and may transmit the MUTUAL AUTHENTICATE Response to the LPA. The LPA may transmit the MUTUAL AUTHENTICATE Response to the terminal secure area. The terminal secure area may transmit the MUTUAL AUTHENTICATE Response to the HW secure area.

In operation 1228, when receiving the MUTUAL AUTHENTICATE Response, the eSE that is the HW secure area may verify the receipt and may generate an SCP03 session key or an SCP03 session key set.

In operation 1230, the eSE that is the HW secure area may transmit, to the terminal secure area, information indicating that generation is completed as a response to an SCP11a secure channel generating request and at least one of a session key and a session key set.

In operation 1232, the TEE that is the terminal secure area may transmit, to the LPA, the information indicating that generation is completed as a response to an SCP11a secure channel generating request and at least one of the session key and the session key set.

In operation 1234, the LPA may allow the following ES10 commands to be included in a Store Data APDU, and then may perform SCP03 protection.
   Get Euicc Configured Addresses
   Set Default Dp Address
   Prepare Download
   Load Bound Profile Package
   Get EUICC Challenge
   Get EUIC CInfo
   List Notification
   Retrieved Notification List
   Remov eNotification From List
   Load CRL
   Authenticate Server
   Cancel Session
   Get Profiles Info
   Enable Profile
   Disable Profile
   Delete Profile
   eUICC Memory Reset
   Get EID
   Set Nickname
   Get RAT In operation 1236, the LPA may transmit a "Store Data" command that is SCP03 protected to the eUICC.

In operation 1238, the eUICC may verify or decrypt the received "Store Data" command that is SCP03 protected. The verification is to verify integrity of content by using the S-MAC key, and the decryption is to decrypt encrypted content by using the S-ENC key. When a failure occurs in the process, the eUICC may transmit a failure response to the LPA.

In operation 1240, when no failure occurs in the verification or the decryption, the eUICC may process content of the "Store Data" command.

In operation 1242, the eUICC may perform SCP03 protection on an APDU response message.

In operation 1244, the eUICC may transmit the APDU response message that is SCP03 protected to the LPA.

In operation 1246, the LPA may perform at least one of decryption and decryption by using at least one of the generated S-ENC and R-MAC keys and may process the APDU response message.

The LPA may use a security function provided by at least one of the HW secure area and the terminal secure area when transmitting an ES10 message used to download a profile or read information of the eUICC to the eUICC, by repeating the above process of FIG. 12.

Figure 13:
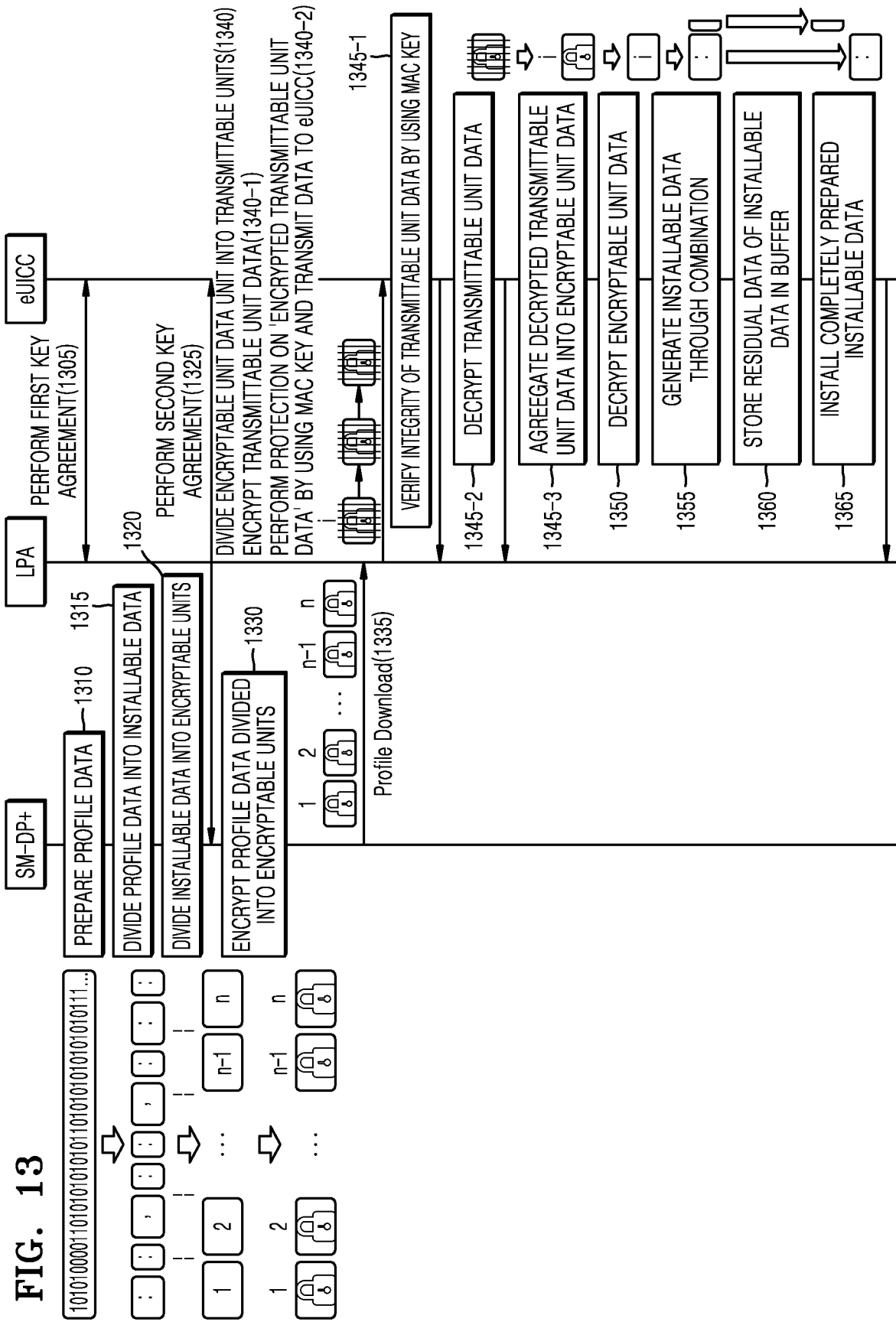
FIG. 13 is an exemplary flowchart for describing an example where a method of controlling access of the LPA in the eUICC is applied to a profile download procedure according to an embodiment.

FIG. 13 is a flowchart for describing an example where a method of controlling access of the LPA in the eUICC is applied to a profile download procedure according to an embodiment.

In operation 1305, the LPA and the eUICC may perform a first key agreement process. The first key agreement process refers to a process of generate a secure channel between the LPA and the eUICC as described with reference to FIGS. 1 through 9.

In operation 1310, an SM–DP+ may prepare profile data that is not encrypted. Operation 1310 may be performed before or after operation 1305.

In operation 1315, the SM-DP+ may divide the profile data into installable data. The installable data may be profile elements.

In operation 1320, the SM-DP+ may divide the installable data into encryptable units. The encryptable units may be data units that may be encrypted by using SCP03t.

In operation 1325, the SM-DP+ and the eUICC may perform a second key agreement process through mutual authentication. A second key is generated irrespective of a first key.

In operation 1330, the SM-DP+ may encrypt the profile data that is divided into the encryptable units in operation 1320 with a key generated in operation 1325. Encryption may be performed not only by using a method (first method) of encrypting the profile data divided into the encryptable units in operation 1320 with the key of operation 1325 but also by using a method (second method) of encrypting the profile data divided into the encryptable units (i.e., encryptable unit data) in operation 1320 with an encryption key that is randomly generated and then encrypting the encryption key with the key generated in operation 1325.

Since the profile data encrypted by using the first method and the second method may be decrypted by using an encryption key of operation 1325, the profile data is collectively referred to as 'profile data encrypted per encryptable unit'.

In operation 1335, the SM-DP+ may transmit the profile data encrypted per encryptable unit to the LPA. In this case, it is assumed that the number of data divided into encryptable units is n.

In operation 1340, the LPA may divide the encryptable unit data into transmittable units (i.e., transmittable unit data).

For example, when each encryptable unit is 1024 bytes and each transmittable unit is 200 bytes, data may be divided into 200 bytes, 200 bytes, 200 bytes, 200 bytes, 200 bytes, and 24 bytes.

In operation 1340-1, the LPA may encrypt a first transmittable unit (first 200 bytes in the above example) based on an S-ENC key that is agreed at step 0.

In operation 1340-2, the LPA may generate an APDU message that is SCP03 protected by generating and joining C-MAC data by using an S-MAC key to protect integrity and may transmit the APDU message to the eUICC. The LPA may sequentially transmit all data from the first data to the last data to the eUICC.

In operation 1345-1, the eUICC may verify integrity of the received transmittable unit data by using the S-MAC key.

In operation 1345-2, the eUICC may decrypt the received transmittable unit data by using the S-ENC key and may transmit a decryption result to the LPA.

The LPA and the eUICC may repeat operations 1340-1, 1340-2, 1345-1, and 1345-2 until all of the transmittable units that constitute each encryptable unit are transmitted.

In operation 1345-3, the eUICC may aggregate the decrypted transmittable units into encryptable unit data.

In operation 1350, the eUICC may verify and decrypt the encryptable unit data by using at least one of the S-ENC and S-MAC keys generated in operation 1325.

In operation 1355, the eUICC may generate complete installable data by combining part of installable data that is previously stored in a buffer and part of installable data that is newly decrypted. The encryptable unit data that is decrypted in operation 1350 may include installable data or may include part of installable data.

In operation 1360, the eUICC may store residual data in the buffer when part of installable data is further necessary.

In operation 1365, when completely prepared installable data is obtained, the eUICC may install the completely prepared installable data.

A profile may be installed by repeatedly performing the above process of FIG. 13 on received encryptable units.

Figure 14:
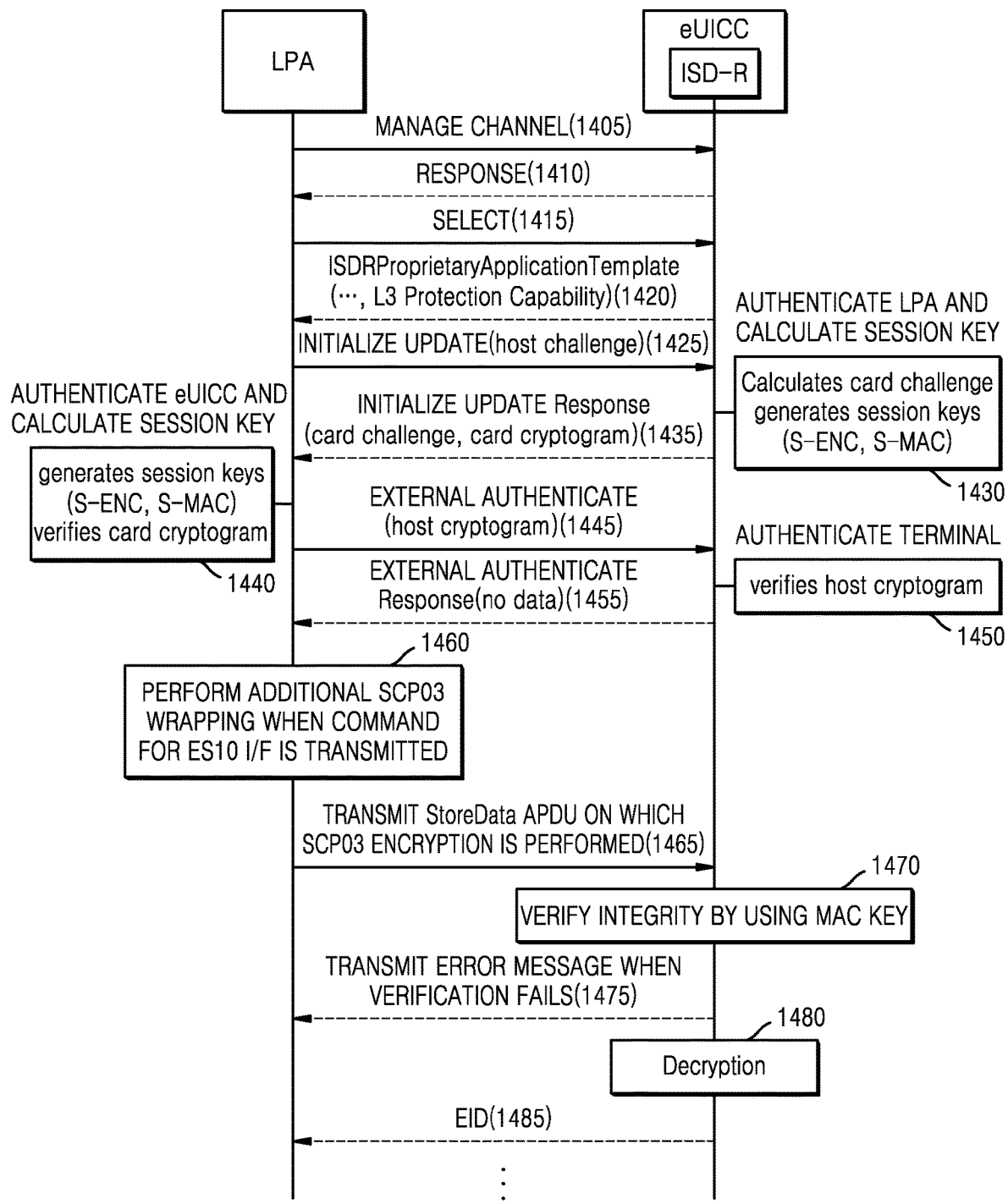
FIG. 14 is a flowchart of a method of controlling access of the LPA in the eUICC according to another embodiment.

FIG. 14 is a flowchart of a method of controlling access of the LPA in the eUICC according to another embodiment.

In operation 1405, the LPA may transmit a "MANAGE CHANNEL" APDU command to the eUICC.

In operation 1410, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1415, the LPA may select an ISD-R corresponding to a secure area of the eUICC by using a "SELECT" command.

In operation 1420, the eUICC may transmit an ISDR Proprietary Application Template including information about an L3 protection capability to the LPA as a reply. The L3 protection capability may include information indicating whether to support a secure channel forming function of the eUICC or specifying a supported secure channel. Even when the L3 protection capability is not included in the ISDR Proprietary Application Template, the LPA may use a predetermined secure channel forming method and a secret key suitable for the pre-determined secure channel forming method. In the present embodiment, it is assumed that the L3 protection capability supports SCP03.

In operation 1425, the LPA may generate a host challenge to generate an SCP03 secure channel, and may transmit an INITIALIZE UPDATE APDU including the host challenge to the eUICC.

In operation 1430, the eUICC may generate a session key or a session key set of an SCP03 session by using a card challenge value that is internally generated, the received host challenge, a sequence counter value, and an SCP03 symmetric key that is stored in the eUICC. The session key or the session key set may include at least one of the following.

An S-ENC key for encryption/decryption

An S-MAC key for integrity protection of a message sent by the LPA

An R-MAC key for integrity protection of a response message sent by the eUICC

Also, the eUICC may generate a card cryptogram used for verification of mutual authentication between the eUICC and the LPA or the terminal secure area.

In operation 1435, the eUICC may allow the generated card cryptogram and a card challenge to be included in an INITIALIZE UPDATE Response and may transmit the INITIALIZE UPDATE Response to the LPA. However, this is an example, and according to another embodiment, a sequence counter may be further included in the INITIALIZE UPDATE Response.

In operation 1440, the LPA may verify the received card cryptogram by using an SCP03 symmetric key. Also, the LPA may generate a session key or a session key set of the SCP03 session that is the same as that generated by the eUICC by using the SCP03 symmetric key, the card challenge, the host challenge, and the sequence counter.

In operation 1445, after the card cryptogram passes the verification and the session key is generated, the LPA may allow a host cryptogram generated by using the SCP03 symmetric key to be included in an EXTERNAL AUTHEN- TICATE APDU message and may transmit the EXTERNAL AUTHENTICATE APDU message so that the eUICC authenticates the LPA.

In operation 1450, the eUICC may verify the host cryptogram received from the LPA and may confirm that the LPA has a valid SCP03 symmetric key.

In operation 1455, the eUICC may transmit an EXTERNAL AUTHENTICATE Response to the LPA to generate an SCP03 secure channel, and may notify the LPA that preparation has been made.

In operation 1460, the LPA may perform additional SCP03 wrapping when a command for an ES10 I/F is transmitted.

When a secure channel pre-generated by using the same method before a secure channel between the LPA and the eUICC is generated is valid, the LPA and the eUICC may use the pre-generated secure channel without newly generating a secure channel.

In operation 1465, the LPA may allow the following ES10 command to be included in a Store Data APDU, and then may transmit the Store Data APDU through the generated secure channel to the eUICC.

Get EID

In operation 1470, when receiving the Store Data APDU that is SCP03 protected, the eUICC may check integrity of the Store Data. APDU that is SCP03 protected by using the generated S-MAC key. Integrity verification may succeed.

In operation 1475, when the integrity verification fails, the eUICC may transmit a failure message to the LPA and may block an unauthorized message.

In operation 1480, the eUICC may decrypt an encrypted message by using the S-ENC key. In this case, when communication is performed by supporting only message integrity protection and omitting encryption/decryption in a key agreement process, a decryption process using the S-ENC key may be omitted. Accordingly, unauthorized access may be controlled without additional encryption and decryption processes.

In operation 1485, when the "GetEID" command is read in a data part of a "Store Data" command that is not encrypted, the eUICC may read an EID that is stored in the eUICC, may allow the EID to be included in a Response APDU, may perform encryption protection on the Response APDU by using the S-ENC key, may generate the Response APDU that is SCP03 protected by adding integrity data by using the R-MAC key, and may transmit the Response APDU that is SCP03 protected to the LPA. Encryption may be omitted even when the Response APDU that is SCP03 protected is generated.

Since the EID is an identifier of the eUICC and the eUICC is mostly embedded and used in a terminal, the EID may be used as an identifier of the terminal. Also, when the EID is used as the identifier of the terminal, the EID may be connected to a specific person, and thus the EID may be related to the user's privacy. Accordingly, the EID has to be safely treated, and may be provided by the eUICC only to an authorized entity for a limited purpose.

Since an unauthorized entity is blocked from reading the EID, privacy may be safely protected.

Figure 15:
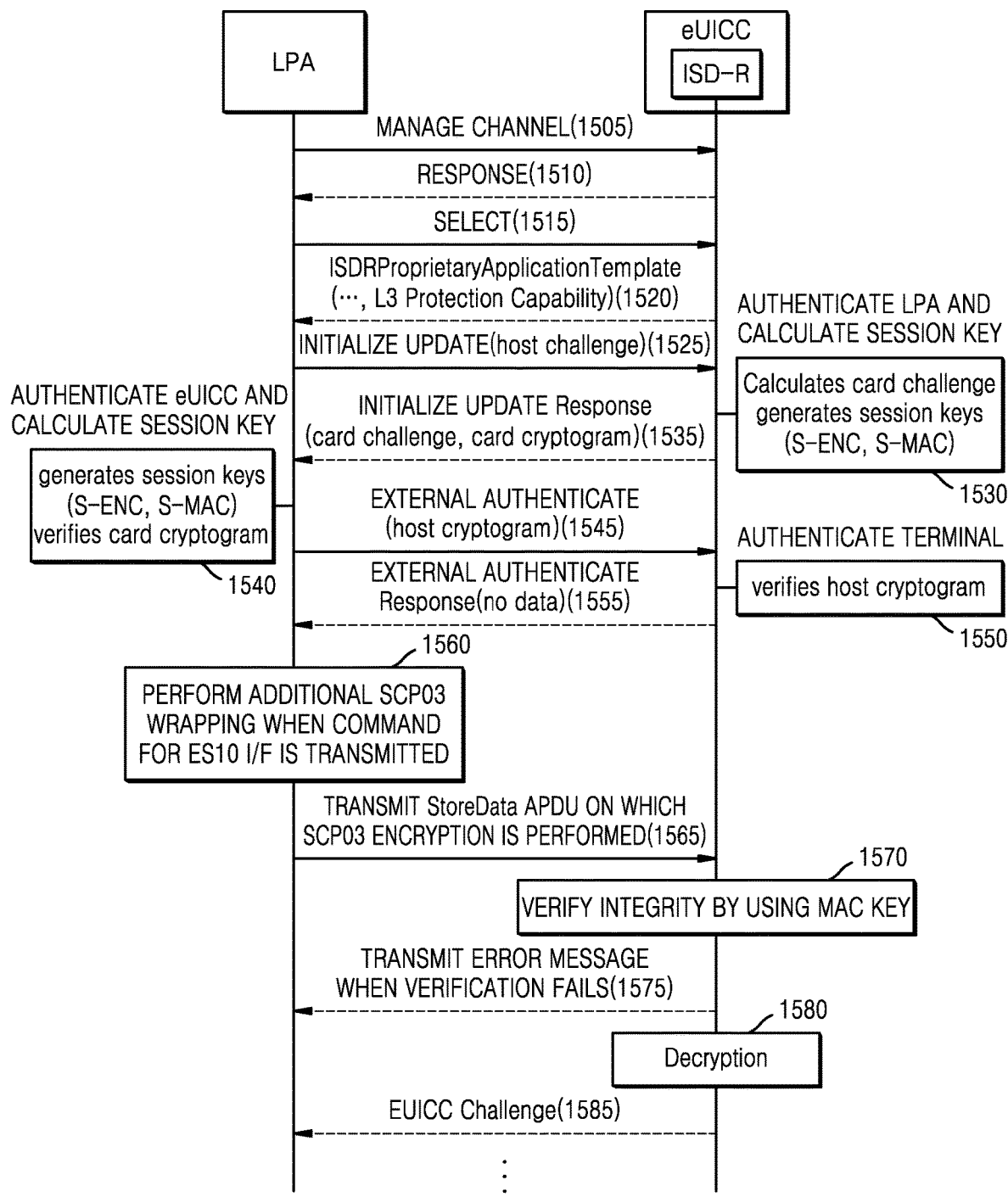
FIG. 15 is a flowchart of a method of controlling access of the LPA in the eUICC according to another embodiment.

FIG. 15 is a flowchart of a method of controlling access of the LPA in the eUICC according to another embodiment.

In operation 1505, the LPA may transmit a "MANAGE CHANNEL" APDU command to the eUICC.

In operation 1510, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1515, the LPA may select an ISD-R corresponding to a secure area of the eUICC by using a "SELECT" command.

In operation 1520, the eUICC may transmit an ISDRProprietaryApplicationTemplate including information about an L3 protection capability to the LPA as a reply. The L3 protection capability may include information indicating whether to support a secure channel forming function of the eUICC or specifying a supported secure channel. Even when the L3 protection capability is not included in the ISDRProprietaryApplicationTemplate, the LPA may use a pre-determined secure channel forming method and a secret key suitable for the pre-determined secure channel forming method. In the present embodiment, it is assumed that the L3 protection capability supports SCP03.

In operation 1525, the LPA may generate a host challenge to generate an SCP03 secure channel, and may transmit an INITIALIZE UPDATE APDU including the host challenge to the eUICC.

In operation 1530, the eUICC may generate a session key or a session key set of an SCP03 session by using a card challenge value that is internally generated, the received host challenge, a sequence counter value, and an SCP03 symmetric key that is stored in the eUICC. The session key or the session key set may include at least one of the following.

An S-ENC key for encryption/decryption

An S-MAC key for integrity protection of a message sent by the LPA

An R-MAC key for integrity protection of a response message sent by the eUICC

Also, the eUICC may generate a card cryptogram used for verification of mutual authentication between the eUICC and the LPA.

In operation 1535, the eUICC may allow the generated card cryptogram and a card challenge to be included in an INITIALIZE UPDATE Response and may transmit the INITIALIZE UPDATE Response to the LPA. However, this is an example, and according to another embodiment, a sequence counter may be further included in the INITIALIZE UPDATE Response.

In operation 1540, the LPA may verify the received card cryptogram by using an SCP03 symmetric key. Also, the LPA may generate a session key or a session key set of the SCP03 session that is the same as that generated by the eUICC by using the SCP03 symmetric key, the card challenge, the host challenge, and the sequence counter.

In operation 1545, after the card cryptogram passes the verification and the session key is generated, the LPA may generate a host cryptogram by using the SCP03 symmetric key, may allow the host cryptogram to be included in an EXTERNAL AUTHENTICATE APDU message, and may transmit the EXTERNAL AUTHENTICATE APDU message so that the eUICC authenticates the LPA.

In operation 1550, the eUICC may verify the host cryptogram received from the LPA and may confirm that the LPA has a valid SCP03 symmetric key.

In operation 1555, the eUICC may transmit an EXTERNAL AUTHENTICATE Response to the LPA to generate an SCP03 secure channel, and may notify the LPA that preparation has been made.

In operation 1560, the LPA may perform additional SCP03 wrapping when a command for an ES10 I/F is transmitted.

When a secure channel pre-generated by using the same method before a secure channel between the LPA and the eUICC is generated is valid, the LPA and the eUICC may use the pre-generated secure channel without newly generating a secure channel.

In operation 1565, the LPA may allow the following ES10 command to be included in a Store Data APDU, and then may transmit the Store Data APDU through the generated secure channel to the eUICC.

GetEUICCC

In operation 1570, when receiving the Store Data APDU that is SCP03 protected, the eUICC may check integrity of the Store Data APDU that is SCP03 protected by using the generated S-MAC key. When integrity verification succeeds, the eUICC may decrypt an encrypted message by using the S-ENC key. In this case, only message integrity protection may be supported and encryption/decryption may be omitted in a key agreement process. In this case, a decryption process using the S-ENC key is omitted. Accordingly, unauthorized access may be controlled without additional encryption and decryption processes.

In operation 1575, when the integrity verification fails, the eUICC may transmit a failure message to the LPA and may block an unauthorized message.

In operation 1580, when the "GetEUICCChallenge" command is read in a data part of a "Store Data" command that is not encrypted, the eUICC may generate an eUICCChallenge value.

In operation 1585, the eUICC may allow data including the EUICCChallenge value to be included in a Response APDU, may encrypt the Response APDU by using the S-ENC key, may generate the Response APDU that is SCP03 protected by adding integrity data by using the R-MAC key, and may transmit the Response APDU that is SCP03 protected to the LPA. Encryption may be omitted even when the Response APDU that is SCP03 protected is generated.

The "GetEUICCChallenge" command that is a command for instructing the eUICC to randomly generate the EUICCChallenge value may be used for the following purposes.

To start a new operation session when a profile download procedure or the like is performed To be used as one of factors for authenticating a server when the generated EUICCChallenge value that is a random value is transmitted to the server, the server performs a digital signature on data including the random value by using an asymmetric private key and an authentication certificate, and signature data is transmitted to the eUICC As described above, the "GetEUICCChallenge" command may be used as a command for starting a new profile download session. While a normal LPA uses a profile download procedure, when the "GetEUICCChallenge" command is transmitted by a malicious entity (e.g., a malicious application) to the eUICC, the eUICC initializes a profile download session and stops the profile download procedure. Accordingly, when the "GetEUICCChallenge" command is not received from an authorized LPA, the eUICC may be in a service unavailable state. The above embodiment may prevent the eUICC from being in a service unavailable state.

Figure 16:
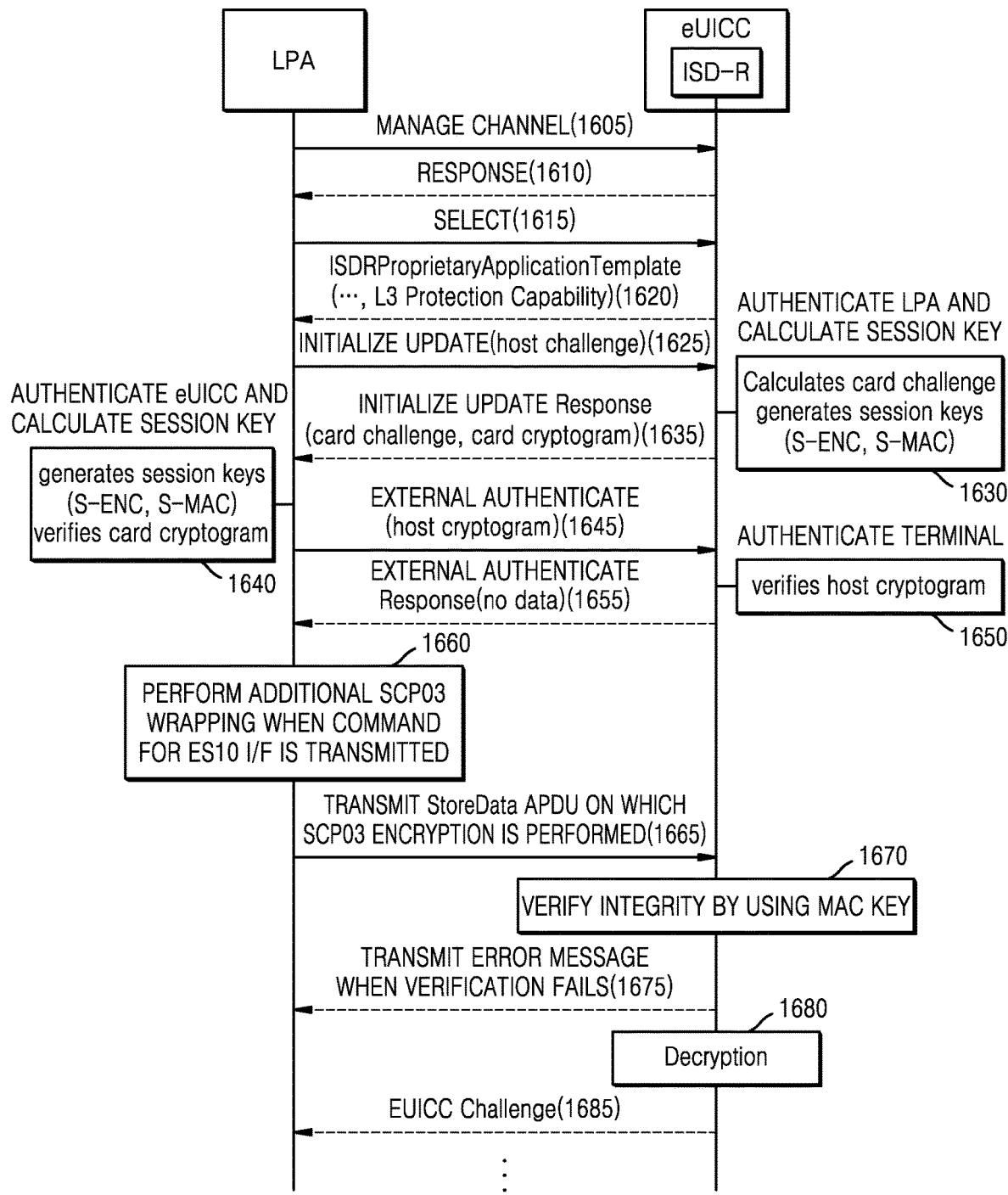
FIG. 16 is a flowchart of a method of controlling access of the LPA in the eUICC according to another embodiment.

FIG. 16 is a flowchart of a method of controlling access of the LPA in the eUICC according to another embodiment.

In operation 1605, the LPA may transmit a "MANAGE CHANNEL" APDU command to the eUICC.

In operation 1610, as the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1615, the LPA may select an ISD-R corresponding to a secure area of the eUICC by using a "SELECT" command.

In operation 1620, the eUICC may transmit an ISDRProprietaryApplicationTemplate including information about an L3 protection capability to the LPA as a reply. The L3 protection capability may include information indicating whether to support a secure channel forming function of the eUICC or specifying a supported secure channel. Even when the L3 protection capability is not included in the ISDRProprietaryApplicationTemplate, the LPA may use a pre-determined secure channel forming method and a secret key suitable for the pre-determined secure channel forming method. In the present embodiment, it is assumed that the protection capability supports SCP03.

In operation 1625, the LPA may generate a host challenge to generate an SCP03 secure channel, and may transmit an INITIALIZE UPDATE APDU including the host challenge to the eUICC.

In operation 1630, the eUICC may generate a session key or a session key set of an SCP03 session by using a card challenge value that is internally generated, the received host challenge, a sequence counter value, and an SCP03 symmetric key that is stored in the eUICC. The session key or the session key set may include at least one of the following.

An S-ENC key for encryption/decryption

An S-MAC key for integrity protection of a message sent by the LPA

An R-MAC key for integrity protection of a response message sent by the eUICC

Also, the eUICC may generate a card cryptogram used for verification of mutual authentication between the eUICC and the LPA.

In operation 1635, the eUICC may allow the generated card cryptogram and a card challenge to be included in an INITIALIZE UPDATE Response and may transmit the INITIALIZE UPDATE Response to the LPA. However, this is an example, and according to another embodiment, a sequence counter may be further included in the INITIALIZE UPDATE Response.

In operation 1640, the LPA may verify the received card cryptogram by using an SCP03 symmetric key. Also, the LPA may generate a session key or a session key set of the SCP03 session that is the same as that generated by the eUICC by using the SCP03 symmetric key, the card challenge, the host challenge, and the sequence counter.

In operation 1645, after the card cryptogram passes the verification and the session key is generated, the LPA may allow a host cryptogram generated by using the SCP03 symmetric key to be included in an EXTERNAL AUTHENTICATE APDU message and may transmit the EXTERNAL AUTHENTICATE APDU message so that the eUICC authenticates the LPA.

In operation 1650, the eUICC may verify the host cryptogram received from the LPA and may confirm that the LPA has a valid SCP03 symmetric key.

In operation 1655, the eUICC may transmit an EXTERNAL AUTHENTICATE Response to the LPA to generate an SCP03 secure channel, and may notify the LPA that preparation has been made.

In operation 1660, the LPA may perform additional SCP03 wrapping when a command for an ES10 I/F is transmitted.

When a secure channel pre-generated by using the same method before a secure channel between the LPA and the eUICC is generated is valid, the LPA and the eUICC may use the pre-generated secure channel without newly generating a secure channel.

In operation 1665, the LPA may allow the following ES10 command to be included in a Store Data APDU, and then may transmit the Store Data APDU through the generated secure channel to the eUICC.

LoadBoundProfilePackage

In operation 1670, when receiving the received Store Data APDU that is SCP03 protected, the eUICC may check integrity of the Store Data APDU that is SCP03 protected by using the generated S-MAC key. When integrity verification succeeds, the eUICC may decrypt an encrypted message by using the S-ENC key. In this case, only message integrity protection may be supported and encryption/decryption may be omitted in a key agreement process. In this case, a decryption process using the S-ENC key is omitted. Accordingly, unauthorized access may be controlled without additional encryption and decryption processes.

In operation 1675, when the integrity verification fails, the eUICC may transmit a failure message to the LPA and may block an unauthorized message.

In operation 1680, when the "Load Bound Profile Package" and is read in a data part of a "Store Data" command that is not encrypted, the eUICC may recognize that encryptable profile data is transmitted as transmittable units and may perform suitable processing. Operation 1680 may correspond to operations 1345-3 through 1365 of FIG. 13.

In operation 1685, the eUICC may encrypt a Response APDU by using the S-ENC key, may generate the Response APDU that is SCP03 protected by adding integrity data by using the R-MAC key, and may transmit the Response APDU that is SCP03 protected to the LPA. Encryption may be omitted even when the Response APDU that is SCP03 protected is generated.

The eUICC according to an embodiment may prevent a profile from being installed in an unauthorized entity by controlling transmission of the "Load Bound Profile Package" command as described above.

In all of the above embodiments, when the LPA requests the terminal secure area to generate an SCP11a secure channel, to generate an SCP11b secure channel, or to generate an SCP03 secure channel, the terminal secure area may check whether the LPA is authorized.

Whether the LPA is authorized may be checked by using at least one of a method by which the terminal secure area checks an ID of an application and a method by which the terminal secure area checks a digital signature of the application.

Figure 17:
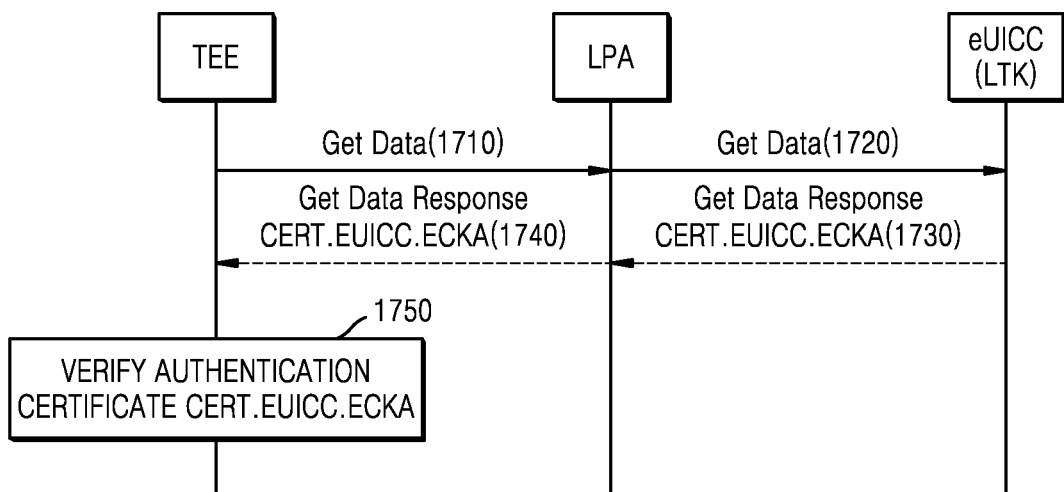
FIG. 17 is a flowchart of a method of transmitting data between a trusted execution environment (TEE), the LPA, and the eUICC when Secure Channel Protocol SCP11a is used according to an embodiment.

Also, an operation corresponding to FIG. 17 may be included as a step in a method using SCP11a (e.g., the method of FIG. 5 or 6). FIG. 17 is a flowchart of a method of transmitting data between the TEE, the LPA, and the eUICC when SCP11a is used according to an embodiment.

In operation 1710, the TEE that is the terminal secure area may transmit a Get Data message to the LPA.

In operation 1720, the LPA may transmit the Get Data message to the eUICC.

In operation 1730, when the Get Data message is received by an ISD-R, the eUICC may transmit an ECKA authentication certificate of the eUICC to the LPA.

In operation 1740, the LPA may transmit the ECKA authentication certificate of the eUICC to the TEE that is the terminal secure area.

In operation 1750, when receiving the ECKA authentication certificate of the eUICC, the TEE that is the terminal secure area may perform verification by using a CA certificate, may extract a public key included in the ECKA authentication certificate of the eUICC, and may store the public key.

Also, an operation corresponding to FIG. 17 may be included as a step in a method using SCP11a (e.g., the method of FIG. 10, 11, or 12).

Figure 18:
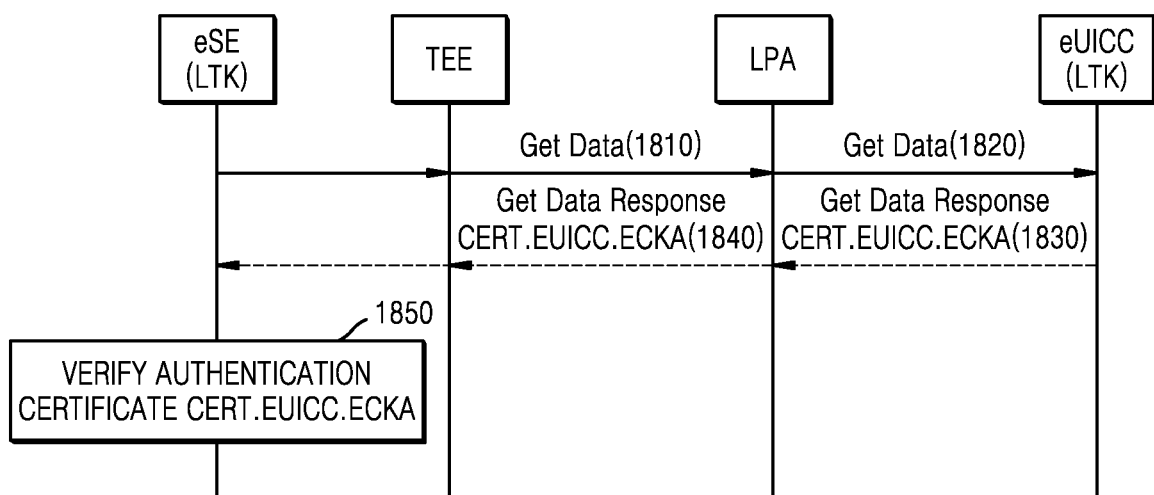
FIG. 18 is a flowchart of a method of transmitting data between an embedded secure element (eSE), the TEE, the LPA, and the eUICC when SCP11a is used according to an embodiment.

FIG. 18 is a flowchart of a method of transmitting data between the eSE, the TEE, the LPA, and the eUICC when SCP11a is used according to an embodiment.

In operation 1810, a Get Data message transmitted from the eSE that is the HW secure area to the terminal secure area may be transmitted from the TEE that is the terminal secure area to the LPA.

In operation 1820, the LPA may transmit the Get Data message to the eUICC.

In operation 1830, when receiving the Get Data message by an ISD-R, the eUICC may transmit an ECKA authentication certificate of the eUICC to the LPA.

In operation 1840, the LPA may transmit the ECKA authentication certificate of the eUICC to the TEE that is the terminal secure area. The TEE that is the terminal secure area may transmit the ECKA authentication certificate of the eUICC to the eSE that is the HW secure area.

In operation 1850, when receiving the ECKA authentication certificate, the eSE that is the HW secure area may perform verification by using a CA certificate, may extract a public key included in the ECKA authentication certificate, and may store the public key.

Figure 19:
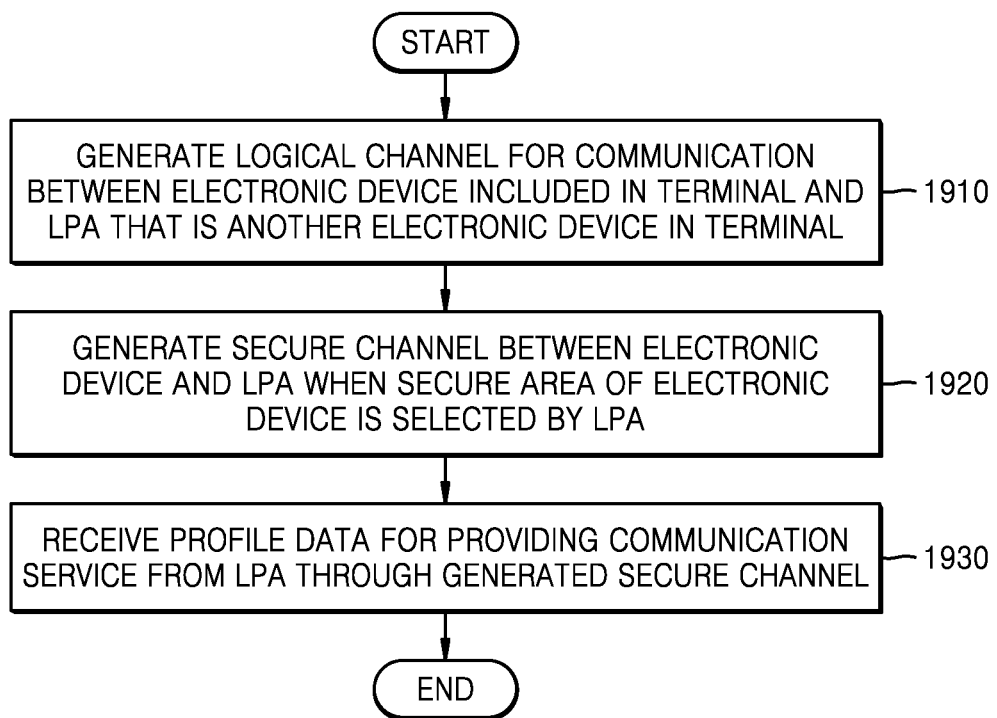
FIG. 19 is a flowchart of a method by which the eUICC receives profile data to provide a communication service according to an embodiment.

FIG. 19 is a flowchart of a method by which the eUICC receives profile data to provide a communication service according to an embodiment.

In the present embodiment, it is assumed that the eUICC is an electronic device.

In operation 1910, an electronic device included in a terminal may generate a logical channel for communication with the LPA that is another electronic device in the terminal.

The LPA may transmit a "MANAGE. CHANNEL" APDU command to the eUICC. As the eUICC receives the "MANAGE CHANNEL" APDU command, the eUICC may transmit a response APDU to the LPA. The response APDU may include a logical channel value.

Accordingly, a logical channel for communication between the LPA and the eUICC may be generated.

In operation 1920, as a secure area of the electronic device is selected by the LPA, the electronic device may generate a secure channel between the electronic device and the LPA. The electronic device may generate the secure channel based on information about a protection capability that is preset or is received from the LPA. The information about the protection capability may correspond to the L3 protection capability of FIGS. 1 through 18.

In operation 1930, the electronic device may receive profile data for providing a communication service from the LPA through the generated secure channel. Protection may be performed on an APDU, in which at least part of the profiled data is included, according to SCP03 or SCP211a through the LPA. Also, the profile data may be a profile that is encrypted by an SM-DP+.

Figure 20:
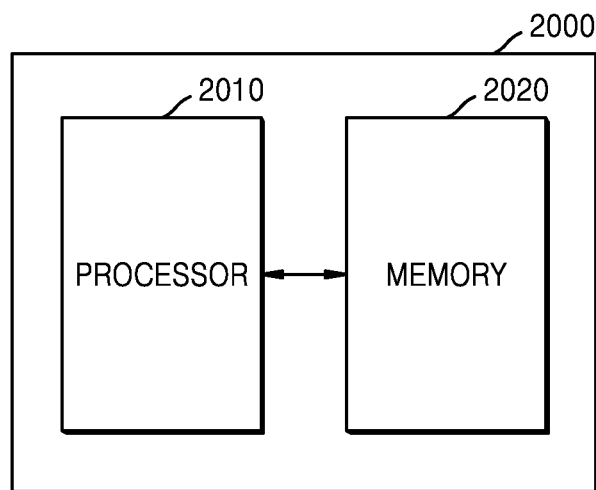
FIG. 20 is a block diagram of an electronic device for providing a communication service according to an embodiment.

FIG. 20 is a block diagram of an electronic device 2000 for providing a communication service according to an embodiment Referring to FIG. 20, the electronic device 2000 may include a processor 2010 and a memory 2020. The processor 2010 and the memory 2020 of the electronic device 2000 may operate according to a method of receiving profile data of the above embodiments. However, elements of the electronic device 2000 according to an embodiment are not limited to those illustrated. According to another embodiment, the electronic device 2000 may include more or fewer elements than those illustrated in FIG. 20. For example, when the electronic device 2000 is attached/detached to/from a terminal, the electronic device 2000 may further include an interface through which the electronic device 2000 is attached/detached to/from the terminal.

In a specific case, the processor 2010 and the memory 2020 may be implemented as one chip.

The processor 2010 may control a series of processes so that the electronic device 2000 operates according to the above embodiment. For example, the processor 2010 may generate a logical channel for communication between the electronic device 2000 included in the terminal and the LPA that is another electronic device in the terminal.

When a secure area of the electronic device is selected by the LPA, the processor 2010 may generate a secure channel between the electronic device and the LPA. Also, the processor 2010 may receive profile data for providing a communication service from the LPA through the generated secure channel. The memory 2020 may have an area for storing data needed for a control process of the processor 2010 and data generated during the control process of the processor 2010. The memory 2020 may include a read-only memory (ROM), or/and a random-access memory (RAM), or/and a hard disk, or/and a compact disc (CD)-ROM, or/and a digital versatile disc (DVD).

Figure 21:
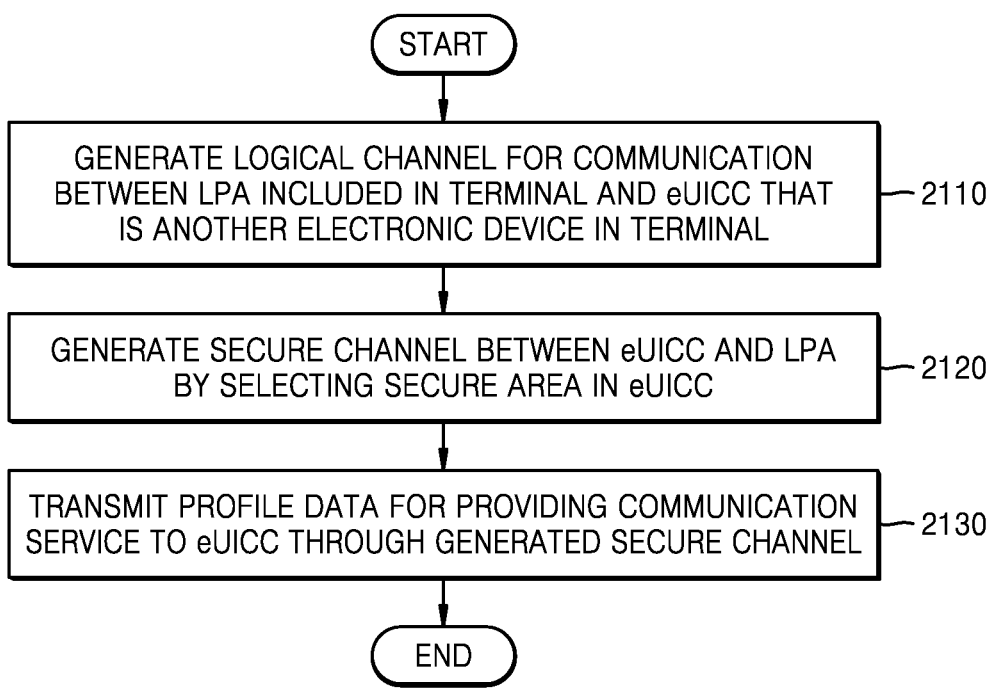
FIG. 21 is a flowchart of a method by which the LPA transmits profile data to provide a communication service according to an embodiment.

FIG. 21 is a flowchart of a method by which the LPA transmits profile data to provide a communication service according to an embedment.

In operation 2110, the LPA included in a terminal may generate a logical channel for communication with the eUICC that is another electronic device in the terminal.

The LPA may transmit a "MANAGE CHANNEL" APDU command to the eUICC. When receiving that "MANAGE CHANNEL" APDU command, the eUICC may transmit a response APDU to the LPA. The response APDU may include a logical channel value.

Accordingly, a logical channel for communication between the LPA and the eUICC may be generated.

In operation 2120, the LPA may generate a secure channel between the eUICC and the LPA by selecting a secure area in the eUICC. As the secure area of the electronic device is selected by the LPA, the secure channel between the electronic device and the LPA may be generated. The LPA may transmit information about a protection capability to the eUICC. However, this is an example, and the information about the protection capability may be preset between the LPA and the eUICC. The information about the protection capability may correspond to the L3 protection capability of FIGS. 1 through 18.

In operation 2130, the LPA may transmit profile data for providing a communication service to the eUICC through the generated secure channel. Protection may be performed on an APDU, in which at least part of the profile data is included, according to SCP03 or SCP11a through the LPA. Also, the profile data may be a profile that is encrypted by an SM-DP+.

Figure 22:
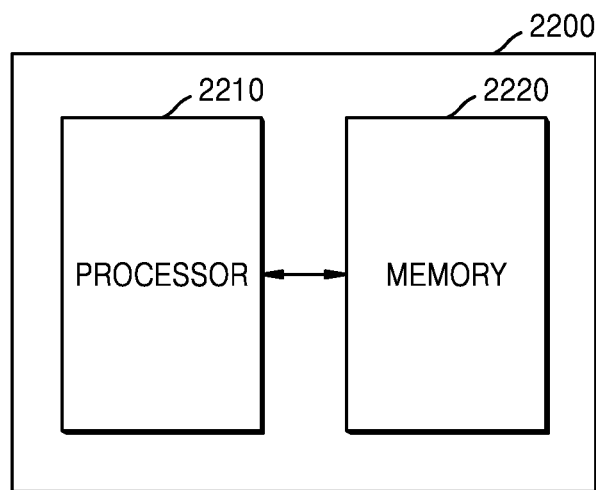
FIG. 22 is a block diagram of another electronic device for providing a communication service according to an embodiment.

FIG. 22 is a block diagram of another electronic device for providing a communication service according to an embodiment.

The other electronic device is referred to as the LPA for convenience of explanation.

Referring to FIG. 22, the LPA 2200 may include a processor 2210 and a memory 2220. The processor 2210 and the memory 2220 of the LPA 2200 may operate according to an LPA control method of receiving profile data of the above embodiments. However, elements of the LPA 2200 according to an embodiment are not limited to those illustrated. According to another embodiment, the LPA 2200 may include more or fewer elements than those illustrated in FIG. 22. For example, the LPA 2200 may further include the TEE or the eSE.

In a specific case, the processor 2210 and the memory 2220 may be implemented as one chip.

The processor 2210 may control a series of processes so that the LPA 2200 operates according to the above embodiment. For example, the processor 2210 may generate a logical channel for communication between the LPA 2200 included in the terminal and the eUICC that is another electronic device in the terminal.

The processor 2210 may generate a secure channel between the eUICC and the LPA 2200 by selecting secure area in the eUICC. Also, the processor 2210 may receive profile data for providing a communication service to the eUICC through the generated secure channel. The memory 2220 may have an area for storing data needed for a control process of the processor 2210 and data generated during the control process of the processor 2210. The memory 2220 may include a ROM or/and a RAM, or/and a hard disk, or/and a CD-ROM, or/and a DVD.

According to the one or more embodiments, unauthorized access may be blocked in a process of installing the profile data in an electronic device in a terminal thereby preventing a malicious applications attack that disrupts installation of profile data.

Methods according to claims or embodiments described herein may be implemented in hardware, software, or a combination of hardware and software.

When implemented in software, a computer-readable storage medium that stores one or more programs (software modules) may be provided. The one or more programs stored in the computer-readable storage medium are configured to be executed by one or more processors in an electronic device (e.g., a terminal or a server). The one or more programs include instructions that cause the electronic device to perform the methods according to claims of the present disclosure or embodiments disclosed herein.

Such programs (software modules or software) may be stored in a memory such as a RAM, a non-volatile memory including a flash memory, a ROM, an electrically erasable programmable ROM (EEPROM), a magnetic disc storage device, a CD-ROM, a DVD, another optical storage device, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), or a storage area network (SAN), or any combination thereof. Such a storage device may access a device that performs an embodiment of the present disclosure via an external port. Further, a separate storage device on the communication network may access a device that performs an embodiment of the present disclosure.

In the above-discussed embodiments of the present disclosure, the elements included in the present disclosure are expressed singular or plural in accordance with the specific embodiment shown. However, it is to be understood that the singular or plural representations are selected appropriately for the sake of convenience of description, and the present disclosure is not limited to the singular or plural constituent elements. Even expressed as a singular element, it may be composed of plural elements, and vice versa. Although embodiments are described herein individually, two or more of the embodiments may be combined.

Embodiments of the present disclosure may also be implemented as computer-readable code in a computer-readable recording medium. The computer-readable recording medium may be any data storage device capable of storing data that may be read by a computer system. Examples of the computer-readable recording medium include ROMs, volatile or nonvolatile memories, CD-ROMs, magnetic tapes, floppy disks, optical data storage devices, and carrier waves (such as data transmission over the Internet). Also, functional programs, code, and code segments for accomplishing the present disclosure may be readily interpreted by programmers skilled in the art to which the present disclosure applies.

It will be appreciated that the device and method according to embodiments of the present disclosure described above may be implemented in hardware, software, or a combination of hardware and software. Such arbitrary software may be stored in a memory such as a volatile or non-volatile storage device such as a storage device such as a ROM, or a memory such as a RAM, a memory chip, a device, or an integrated circuit, whether erasable or rewritable, or a storage medium readable by a machine (e.g., a computer) as well as being optically or magnetically recordable, such as a CD, a DVD, a magnetic disk, or a magnetic tape. The method according to embodiments of the present disclosure pray be implemented by a network entity such as a computer including a control unit and a memory or a server managed by a network operator in various portable terminals or wireless communication systems. It will be appreciated that the memory is a machine-readable storage medium suitable for storing programs or programs containing instructions for implementing the examples.

Accordingly, embodiments of the present disclosure include a program including code for implementing the device or method recited in the claims, and a storage medium readable by a machine (e.g., a computer) for storing the program.

While one or more embodiments have been described with reference to the figures, it will be understood by one of ordinary skill in the art that various changes in form and details may be made therein without departing from the spirit and scope as defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method providing a communication service, by a security module included in a terminal, the method comprising:
receiving a command indicating a secure area of the security module, from a local profile assistant (LPA) module included in the terminal;
transmitting protection capability information of the security module to the LPA module, in response to receiving the command,
generating a secure channel between the security module and the LPA module, based on the protection capability information of the security module; and
receiving profile data for providing the communication service, from the LPA module through the generated secure channel.

2. The method of claim 1, wherein receiving the profile data comprises receiving the profile data protected based on a session key obtained by the LPA module or trusted execution environment (TEE) module or embedded secure element (eSE).

3. The method of claim 1, wherein receiving the profile data comprises, in response to a session key obtained by a trusted execution environment (TEE) being transmitted to the LPA, receiving the profile data protected based on the session key from the LPA.

4. The method of claim 1, wherein receiving the profile data comprises, in response to a session key obtained by an eSE being transmitted to a TEE module, receiving, through the LPA module, the profile data protected based on the session key from the TEE module.

5. The method of claim 1, wherein receiving the profile data comprises, in response to a session key obtained by an eSE being transmitted to the LPA module through a TEE module, receiving the profile data protected based on the session key, from the LPA module.

6. The method of claim 1, wherein the protection capability information includes information indicating whether to support the secure channel between the security module and the LPA module.

7. A security module included in a terminal for providing a communication service, the security module comprising:
at least one processor configured to:
receive a command indicating a secure area of the security module, from a local profile assistant (LPA) module included in the terminal,
transmit protection capability information of the security module to the LPA module, in response to receiving the command,
generate a secure channel between the security module and the LPA module, based on the protection capability information of the security module, and
receive profile data for providing the communication service, from the LPA module through the generated secure channel; and
a memory configured to store the profile data.

8. The security module of claim 7, wherein the at least one processor is further configured to receive the profile data protected based on a session key obtained by the LPA module or a trusted execution environment (TEE) module or an embedded secure element (eSE).

9. The security module of claim 7, wherein the at least one processor is further configured to, in response to a session key obtained by a TEE module corresponding to a terminal secure area being transmitted to the LPA module, receive the profile data that is protected based on the session key from the LPA module.

10. The security module of claim 9, wherein the at least one processor is further configured to, in response to the session key obtained by the TEE module based on a static shared key and a one-time shared key being transmitted to the LPA module, receive the profile data protected based on the session key from the LPA module.

11. The security module of claim 7, wherein the at least one processor is further configured to, when a session key obtained by an eSE corresponding to an HW secure area being transmitted to the LPA module through a TEE module corresponding to a terminal secure area, receive the profile data that is protected based on the session key from the LPA module.

12. The security module of 7, wherein the protection capability information includes information indicating whether to support the secure channel between the security module and the LPA module.

13. A method providing a communication service, by a LPA (local profile assistant) module included in a terminal, the method comprising:
- transmitting a command indicating a secure area of a security module included in the terminal,
- receiving protection capability information of the security module, from the security module, in response to the command being received at the security module,
- generating a secure channel between the security module and the LPA module based on the protection capability information of the security module, and
- transmitting profile data for providing the communication service, to the security module through the generated secure channel.

14. The method of claim 13, wherein transmitting the profile data comprises transmitting the profile data protected based on a session key obtained by the LPA module or trusted execution environment (TEE) module or embedded secure element (eSE).

15. The method of claim 13, wherein transmitting the profile data comprises, in response to a session key obtained at a trusted execution environment (TEE) being transmitted to the LPA, transmitting the profile data protected based on the session key to the security module.

16. The method of claim 13, wherein transmitting the profile data comprises, in response to a session key obtained by an eSE being transmitted to a TEE module, transmitting, the profile data protected based on the session key, to the security module.

17. The method of claim 13, wherein receiving the profile data comprises, in response to a session key obtained by an eSE being transmitted to the LPA module through a TEE module, transmitting the profile data protected based on the session key, to the security module.

18. The method of claim 13, wherein the protection capability information includes information indicating whether to support the secure channel between the security module and the LPA module.

19. A local profile assistant (LPA) module included in a terminal for providing a communication service, the LPA module comprising:
- at least one processor configured to:
  - transmit a command indicating a secure area of a security module included in the terminal,
  - receive protection capability information of the security module, from the security module included in the terminal, in response to the command being received at the security module,
  - generate a secure channel between the security module and the LPA module, based on the protection capability information of the security module, and
  - transmit profile data for providing the communication service, to the security module through the generated secure channel; and
- a memory configured to store the profile data.

20. The LPA module of claim 19, wherein the at least one processor is further configured to transmit the profile data protected based on a session key obtained by the LPA module or a trusted execution environment (TEE) module or an embedded secure element (eSE).

21. The LPA module of claim 19, wherein the at least one processor is further configured to, in response to a session key obtained at a trusted execution environment (TEE) being transmitted to the LPA, transmit the profile data protected based on the session key to the security module.

22. The LPA module of claim 19, wherein the at least one processor is further configured to, in response to a session key obtained by an eSE being transmitted to a TEE module, transmit the profile data protected based on the session key, to the security module.

23. The LPA module of claim 19, wherein the at least one processor is further configured to, in response to a session key obtained by an eSE being transmitted to the LPA module through a TEE module, transmit the profile data protected based on the session key, to the security module.

24. The LPA module of claim 19, wherein the protection capability information includes information indicating whether to support the secure channel between the security module and the LPA module.

* * * * *